(12) United States Patent
Uemura

(10) Patent No.: US 7,577,897 B2
(45) Date of Patent: Aug. 18, 2009

(54) DATA INTEGRITY INSPECTION SUPPORT METHOD FOR DISK DEVICES, AND DATA INTEGRITY INSPECTION METHOD FOR DISK DEVICES

(75) Inventor: Tetsuya Uemura, Saitama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 554 days.

(21) Appl. No.: 11/274,571

(22) Filed: Nov. 14, 2005

(65) Prior Publication Data

US 2006/0129876 A1    Jun. 15, 2006

(30) Foreign Application Priority Data

Nov. 25, 2004    (JP) .............................. 2004-339723

(51) Int. Cl.
*G11C 29/00* (2006.01)
(52) U.S. Cl. .................................... 714/770
(58) Field of Classification Search .................. 714/6, 714/763, 764, 769, 770
See application file for complete search history.

(56) References Cited

U.S. PATENT DOCUMENTS

| 5,745,671 | A | * | 4/1998 | Hodges ......................... 714/6 |
| 5,958,067 | A | * | 9/1999 | Kaneda et al. ................. 714/6 |
| 6,526,477 | B1 | * | 2/2003 | Yuan et al. ................... 711/114 |

FOREIGN PATENT DOCUMENTS

JP    2002-149503    5/2002

* cited by examiner

*Primary Examiner*—Shelly A Chase
(74) *Attorney, Agent, or Firm*—Townsend and Townsend and Crew LLP; Patrick Duncan

(57) ABSTRACT

Embodiments of the invention provide a disk device data integrity verification support method that allows data integrity verification of a disk array apparatus without consuming an interface band of disk devices. In one embodiment, arithmetic operations for data integrity verification are divided into those of a first phase that can be performed at least in the disk devices, and those of a second phase that can be performed in the disk array apparatus only. The arithmetic operations of the first phase are conducted using the following procedure: data is read out from a storage medium, saved arithmetic operation interim results are read out, the arithmetic operations using the two sets of data are conducted, and arithmetic operation results are saved as new interim results. During the arithmetic operations of the second phase, arithmetic operation results of the first phase are read out from each disk device and further arithmetic operations are conducted between those arithmetic operation results.

19 Claims, 15 Drawing Sheets

| ADDR | STATUS |
|------|--------|
| 000  | DIRTY  |
| 001  | READ   |
| 002  | READ   |
| 003  | R-QUE  |
| 004  | R-QUE  |
| 005  | W-QUE  |
| 006  | W-QUE  |
| 007  | NONE   |
| ⋮    | ⋮      |
| xyz  | NONE   |

Fig. 10

| GRPID | XOR |
|---|---|
| 00 | 19a3 5fe3 2a7d ••• a7ed |
| 01 | 06ac 2fc8 37b1 ••• 4071 |
| 02 | 8a91 386a fa8b ••• 61b9 |
| 03 | 510a 78ea 158f ••• 1842 |
| 04 | 718a 1968 0805 ••• 19a2 |
| 05 | 2856 ab98 98ae ••• 09ae |
| ⋮ | ⋮ |
| mn | ffff ffff ffff ••• ffff |

1001 → GRPID column
1002 → XOR column

Fig. 17

| BLOCK GROUP STATUS | | HDD STATUS | | |
|---|---|---|---|---|
| BLOCK ID | STATUS | HDD ID | STATUS | FAILURE MODE |
| 00 | OK | 0 | OK | |
| 01 | OK | 1 | NG | Write head failure |
| 02 | OK | 2 | OK | |
| 03 | OK | 3 | WARN | Retry threshold |
| 04 | NG | | | |
| 05 | OK | | | |
| 06 | OK | | | |
| 07 | N/A | | | |
| 08 | N/A | | | |
| 09 | N/A | | | |
| 10 | N/A | | | |
| 11 | N/A | | | |
| 12 | N/A | | | |
| 13 | N/A | | | |
| 14 | N/A | | | |

DATA INTEGRITY INSPECTION SUPPORT METHOD FOR DISK DEVICES, AND DATA INTEGRITY INSPECTION METHOD FOR DISK DEVICES

CROSS-REFERENCES TO RELATED APPLICATIONS

This application claims priority from Japanese Patent Application No. JP2004-339723, filed Nov. 25, 2004, the entire disclosure of which is incorporated herein by reference.

BACKGROUND OF THE INVENTION

The present invention relates to a method for inspecting data integrity in disk devices, and more particularly, to a method of inspecting data integrity in the built-in disk devices of a disk array apparatus by, while reducing the data traffic in the disk devices, conducting first-step arithmetic operations with the internal controllers of the disk devices and then conducting second-step arithmetic operations with the internal disk array controller of the disk array apparatus.

Recent storage subsystems employ, instead of conventional large-scale disks, the RAID system that was proposed by Patterson et al. (D. A. Patterson, G. A. Gibson, R. H. Katz, "A Case for Redundant Arrays of Inexpensive Disks (RAID)", Proceedings of the International Conference on Management of Data (SIGMOD), June 1988, pp. 109-116). At RAID-3, RAID-4, and RAID-5 levels, multiple hard-disk drives (HDDs) are used and parity data is saved in one of the devices. For example, if four HDDs are used, data is saved in three of them and parity data is saved in the remaining device. Such an HDD arrangement is called 3D+1P.

Although the following description is given taking RAID-5 as an example, similar understanding is also possible for other RAID levels such as RAID-3, RAID-4, and RAID-6.

At RAID-5, data from a host computer is split according to a block size such as 4 KB or 8 KB, and sequentially written into multiple HDDs. Under a 3D+1P arrangement, after three sets of data, "Data1", "Data2", and "Data3", have been written into three HDDs, "Parity" is written as parity data into the remaining device. "Parity" is generated by calculating the exclusive logical sum between "Data1", "Data2", "Data3", and "Expected Value", as in formula (1).

[Formula 1]

$$\text{Parity} = \text{Data1} \oplus \text{Data2} \oplus \text{Data3} \oplus \text{Expected Value} \quad (1)$$

For odd parity, 1 is assigned to all bits in "Expected Value". Even if arbitrary data is destructed, the remaining data, parity data, and "Expected Value" can be used to regenerate normal data from the destructed data. A formula for regenerating "Data3" from "Data1", "Data2", "Parity", and "Expected Value", is shown as formula (2). In this case, even if one of the HDDs which constitute RAID-5 fails, data can be regenerated from the data saved in the remaining HDDs. That is to say, RAID-5 is of the architecture that allows recovery from a single-device failure.

[Formula 2]

$$\text{Data3} = \text{Data1} \oplus \text{Data2} \oplus \text{Expected Value} \quad (2)$$

The configuration of a conventional disk array apparatus is shown in FIG. 3. Reference numeral 300 in FIG. 3 denotes the conventional disk array apparatus, 301 a host computer interface, 302 an internal connection bus, 303 a memory controller, 304 a processor bus, 305 a microprocessor, and 306 an OR operational element. Reference numeral 307 denotes a memory bus, 308 a cache memory, 309 a disk device interface, 310 a disk device connection bus, 311 a disk device, 321 the host computer, and 322 a host computer connection bus.

An operational outline of the disk array apparatus is given below with reference to FIG. 3. The host computer 321 transmits a command and data to the disk array apparatus 300 via the host computer connection bus 322 formed of an element such as SCSI (Small Computer System Interface) or FC-AL (FibreChannel Arbitrated Loop). At the disk array apparatus 300, the command and data from the host computer 321 are received using the host computer interface (host interface) 301. Through the internal bus 302 such as a PCI bus, the host interface 301 saves the received command and data in the cache memory 308 via the memory controller 303 and the memory bus 307. The microprocessor 305 accesses the cache memory 307 through the processor bus 304 and the memory controller 303.

If the received command is a writing command, the microprocessor 305 generates parity data using not only the received data saved in the cache memory 308, but also the XOR operational element 306, and saves the parity data in the cache memory 308. The disk device interface (disk interface) 309 connected to the memory controller 303 by the internal bus 302 reads out the received data and the parity data from the cache memory 308, and writes both into multiple disk devices 311. The disk interface 309 and the disk devices 311 are connected to each other by the disk device connection bus 310 formed of an element such as SCSI or FC-AL.

If the received command is a readout command, the disk interface 309 reads out data from the disk devices 311 and stores the data into the cache memory 308. Next, the host interface 301 reads out the stored data from the cache memory 308 and transmits the data to the host computer 321.

The host interface 301, the memory controller 303, the microprocessor 305, the cache memory 308, the disk interface 309, and other elements form a disk array controller.

If a failure occurs in either of the disk devices 311, the disk interface 309 notifies the disk device failure to the microprocessor 305. The microprocessor 305 then displays the occurrence of the disk failure, at a console (not shown in FIG. 3) of the disk array apparatus 300, thus prompting an administrator of the disk array apparatus 300 to replace the abnormal disk device 311 with a normal disk device 311. After replacement with a normal disk device 311, the microprocessor 305 uses the disk interface 309 to read out data from the normal disk device 311. Next, the microprocessor 305 uses the XOR operational element 306 to generate data that is to be stored into the normal disk device 311, and uses the disk interface 309 to write the data into the normal disk device 311.

At RAID-5, since the number of sets of parity data is one, although the disk array apparatus can be recovered from a single-device failure in which one disk device suffers damage, the apparatus cannot be recovered from a dual-device failure in which two disk devices suffer damage. One of the biggest problems associated with RAID-5 failure recovery occurs if, while data is being read out from a disk device to regenerate data, another failure that has not been detected up to now is discovered and results in a dual-device failure occurring. Data loss thus results since recovery from a dual-device failure is impossible. This failure occurs, for example, if a write head for writing onto a storage medium, located within the disk device, is damaged and despite normal response to the disk array controller with a writing command, the write head fails to write data. If a read head for reading out data from the storage medium of the disk device is normal, since data readout can be executed properly, such a failure is very difficult to detect. To detect a failure in one disk device alone, there is no alternative but to conduct readout tests immediately after writing all data. However, this method is not realistic since it significantly deteriorates the disk device in performance. Accordingly, to verify data integrity in disk devices, there is a need to read out all data from all disk devices mounted in the disk array apparatus, and then perform arithmetic operations for the verification of data integrity.

A method of verifying data integrity is described below using FIG. 5 and formula (3). FIG. 5 is a schematic diagram of block addresses in RAID-5. Reference numeral 501 in FIG. 5 denotes block addresses of a first disk device; 502, block addresses of a second disk device; 503, block addresses of a third disk device; 504, block addresses of a fourth disk device; and 505, block addresses.

Formula (3) is a data integrity verification formula for RAID-5.

[Formula 3]

$$XOR\text{-}abc = 0\text{-}abc \oplus 1\text{-}abc \oplus 2\text{-}abc \oplus 3\text{-}abc \quad (3)$$

At RAID-5, data from the host computer (host) is split according to a block size such as 4 KB or 8 KB, and stored into multiple disk devices. Addresses of each block size are assigned from a beginning part of a sector address in each disk device. These addresses are called block addresses. Additionally, a disk identifier is also assigned to make it possible to uniquely specify to which disk device a particular block address group is assigned. For example, if the identifier of the disk device is N and the block address is "abc", that block can be specified as N-abc to denote, for example, block address 505. The block addresses of each disk device range from "000" to "xyz", as 501, 502, 503, or 504, for example. An identifier of the first disk device is defined as 0, an identifier of the second disk device, as 1, an identifier of the third disk device, as 2, and an identifier of the fourth disk device, as 3.

In order to verify integrity of the data written in, for example, block address "abc", data is read out from the "abc" block addresses of the first to fourth disk devices and then XOR arithmetic operations are performed to calculate XOR-abc. If the data is recorded properly, XOR-abc becomes an expected value.

To verify data integrity in this way, data within the disk devices 311 must be read into the cache memory 308 by using the disk device connection bus 310, and arithmetic operations with the XOR operational element 306 must be conducted. This process consumes an interface band of each disk device 311 and a band of the disk device connection bus 310, and thus reduces the capability of the disk array apparatus 300 to process requests of the host computer 321. Similarly, a capacity of the cache memory 308 for processing requests of the host computer 321, and an available time of the XOR operational element 306 are reduced and this, in turn, reduces a processing capability of the disk array apparatus 300.

In order to avoid such reduction in the processing capability of a disk array apparatus, the "Auxiliary Storage Device Diagnosing Method, Information Processing Apparatus, and Storage Medium with Stored Procedure for Diagnosing Auxiliary Storage Section" described in Japanese Patent Laid-open No. 2002-149503 proposes a technique that uses the idle time of a processor to diagnose an auxiliary storage device.

BRIEF SUMMARY OF THE INVENTION

The problem in that all data stored into disk devices must be read out using the interface bands of the disk devices is not yet solvable with the method of Japanese Patent Laid-open No. 2002-145903.

A first feature of the present invention is to provide a method that supports data integrity verification of disk devices each making data integrity verification of a disk array apparatus possible without consuming an interface band of the particular disk device.

A second feature of the present invention is to provide a method that supports data integrity verification of disk devices each of which makes it possible, by specifying an address range, to verify data integrity of a disk array apparatus without consuming an interface band of the particular disk device.

A third feature of the present invention is to provide a method that supports data integrity verification of disk devices each of which makes it possible, by specifying a block size, to verify data integrity of a disk array apparatus without consuming an interface band of the particular disk device.

A fourth feature of the present invention is to provide a method that supports data integrity verification of disk devices each of which makes it possible, even when a writing request from a host apparatus occurs, to verify data integrity of a disk array apparatus without consuming an interface band of the particular disk device.

A fifth feature of the present invention is to provide a method that supports data integrity verification of disk devices each making it possible to specify a priority level for data verification and to verify data integrity of a disk array apparatus without consuming an interface band of the particular disk device.

A sixth feature of the present invention is to provide a method that supports data integrity verification of disk devices each capable of being used to manage for up to what address an arithmetic operation session has been executed, and each making data integrity verification of a disk array apparatus possible without consuming an interface band of the particular disk device.

A seventh feature of the present invention is to provide a method that supports data integrity verification of disk devices each allowing interim results of arithmetic operations to be saved on an address range-by-range basis, and data integrity of a disk array apparatus to be verified without consuming an interface band of the particular disk device.

An eighth feature of the present invention is to provide a method that supports data integrity verification of a disk array apparatus which makes it possible, by using disk devices each having an integrity verification support function, to verify data integrity of the disk array apparatus without consuming an interface band of the particular disk device.

A ninth feature of the present invention is to provide a method that supports data integrity verification of a disk array apparatus which makes it possible to identify a failing disk device in the disk array apparatus whose internal data integrity is disturbed, and to verify data integrity of the disk array apparatus without consuming an interface band of the particular disk device.

Methods for supporting data integrity inspection of a disk device, and methods for inspecting data integrity of a disk array apparatus according to the present invention have the following mechanisms to achieve the foregoing objects.

In a support method for data integrity inspection in a disk device according to an aspect of the present invention, the disk device having a storage medium, a buffer for temporary storage, and a controller that conducts reading and writing control on the storage medium and the temporary storage buffer by exchanging a command and data with a host apparatus, the controller repeatedly performs the steps of:

reading out a desired data size of first data from a readout address of the storage medium;

reading out the desired data size of second data from the temporary storage buffer;

conducting an arithmetic operation between the first data and the second data;

writing the arithmetic operation results obtained from the arithmetic operation, into the temporary storage buffer; and updating the readout address.

Upon receiving the address specifying command issued from the host apparatus, the controller can set the starting address and/ending address of data readout from the storage medium. Also, upon receiving the data size specifying command issued from the host apparatus, the controller can set the data size. The foregoing arithmetic operation can be exclusive logical summation.

Upon receiving a writing command issued from the host apparatus, the controller performs the steps of: inspecting whether the data readout step mentioned above is being executed for the address of the storage medium that is specified in the writing command; and if the readout step is already performed, after executing the above-mentioned data readout step and arithmetic operation conducting step for an address of the data which has been read, executing the writing command, reading out the data from the address for which the writing command is executed, and conducting arithmetic operations.

Upon receiving a command from the host apparatus, the controller performs the steps of: identifying the type of command which has been received; setting an execution priority level for the received command according to the particular type thereof; judging from the set execution priority level whether the received command can be executed; if the command is judged to be executable, executing the command; if the command is judged not to be executable, queuing the command; updating the execution priority level of the command after being queued; and executing the command that has been made executable by the updating of the execution priority level.

After interpreting the arithmetic operation execution instruction issued from the host apparatus, the controller may start executing the process for supporting data integrity inspection of the disk device. After interpreting the arithmetic operation execution instruction issued from the host apparatus, the controller may raise the execution priority level of the data integrity inspection support process for the disk device.

After receiving an arithmetic operation result readout command issued from the host apparatus, the controller reads out arithmetic operation results from the temporary storage buffer and transmits the arithmetic operation results to the host apparatus as a response to the arithmetic operation result readout command.

According to another aspect of the invention, in a support method for data integrity inspection in a disk device having a storage medium, a buffer for temporary storage, and a controller that controls writing into or reading from the storage medium and the temporary storage buffer by exchanging a command and data with a host apparatus, the controller performs:

a step of reserving in the storage medium or the temporary storage buffer a readout state management table for managing relationships between addresses within the storage medium and respective readout states;

until all readout states in the readout state management table have become readout completion states, for each address, the additional steps of:

reading out a desired data size of first data from the storage medium;

reading out the desired data size of second data from the temporary storage buffer;

conducting an arithmetic operation between the first data and the second data;

writing the first arithmetic results obtained from the arithmetic operation, into the temporary storage buffer; and changing a readout state of an associated address within the readout state management table to a readout completion state;

the further step of:

examining, within the readout state management table, a readout state associated with the address requested by the readout command issued from a host apparatus, and if the readout state indicates that readout is not completed, changing the particular readout state to a readout queue; and when executing the readout command, if the readout state of the address requested by the readout command indicates that the readout is queued, the further steps of:

reading out the desired data size of third data from the storage medium;

reading out the desired data size of fourth data from the temporary storage buffer;

conducting an arithmetic operation between the third data and the fourth data;

writing the second arithmetic results obtained from the arithmetic operation, into the temporary storage buffer; and changing, within the readout state management table, the readout state associated with the address requested by the readout command, to a readout completion state.

The controller, after receiving a writing command from the host apparatus, performs the steps of: examining the readout state within the readout state management table that is associated with the address requested by the writing command, and if the readout state indicates that the readout is not completed or that the readout is queued, changing the particular readout state to a writing queue, or if the readout state indicates that the readout is completed, changing the particular readout state to a readout invalid state. When executing the writing command, the controller further performs the steps of, if the readout state of the address requested by the writing command indicates that writing is queued, executing the writing command and changing, within the readout state management table, the readout state associated with the address requested by the writing command, to a readout non-completion state, or if the readout state of the address requested by the writing command indicates a readout invalid state, reading out the desired data size of fifth data from the address in the storage medium that is requested by the writing command, reading out the desired data size of sixth data from the temporary storage buffer, conducting an arithmetic operation between the fifth data and the sixth data, writing the third arithmetic results obtained from the arithmetic operation, into the temporary storage buffer, executing the writing command, reading out the desired data size of seventh data from the address of the storage medium that is requested by the writing command, reading out the desired data size of eighth data from the temporary storage buffer, conducting an arithmetic operation between the seventh data and the eighth data, writing the fourth arithmetic results obtained from the arithmetic operation, into the temporary storage buffer, and changing, within the readout state management table, the readout state associated with the address requested by the readout command, to a readout completion state.

According to another aspect of the present invention, in a support method for data integrity inspection in a disk device having a storage medium, a buffer for temporary storage, and a controller that controls writing into or reading from the storage medium and the temporary storage buffer by exchanging a command and data with a host apparatus, the controller performs the steps of:

reserving in the storage medium or the temporary storage buffer an arithmetic operation result management table for managing a relationship between an address range of the storage medium and arithmetic operation results; and reserving in the storage medium or the temporary storage buffer a readout state management table for managing relationships between addresses within the storage medium and respective readout states;

until all readout states in the readout state management table have become readout completion states, for each address, the additional steps of:

reading out arithmetic results from the entry of the arithmetic operation result management table that is associated with the particular address;

reading out first data from the address of the storage medium;

arithmetically deriving new arithmetic results the arithmetic results and the first data;

writing the new arithmetic operation results obtained from the arithmetic operation, back into the entry of the arithmetic operation result management table that is associated with the address; and changing the entry of the readout state management table that is associated with the address, to a readout completion state;

the further steps of:

examining, within the readout state management table, a readout state associated with the address requested by the readout command issued from the host apparatus, and changing the particular readout state to a readout queue if the readout state indicates that readout is not completed;

examining, within the readout state management table, a readout state associated with the address requested by the writing command issued from the host apparatus, and changing the particular readout state to a writing queue if the readout state indicates that readout is not completed or that the readout is queued, or changing the particular readout state to a readout invalid state if the readout state indicates that the readout is completed;

when executing data readout from the storage medium, if, in the readout state management table, the readout state of the associated readout address indicates that the readout is not completed or that the readout is queued, the further steps of:

reading out arithmetic results from the entry of the readout state management table that is associated with the particular readout address;

reading out second data from the readout address within the storage medium;

arithmetically deriving new arithmetic results from the arithmetic results and the second data;

writing the new arithmetic operation results back into the entry of the arithmetic operation result management table that is associated with the readout address; and changing the entry of the readout state management table that is associated with the readout address, to a readout completion state;

if, in the readout state management table, the readout state of the address associated with the readout address is other than a readout non-completion state or a readout queue, the step of reading out the second data from the readout address within the storage medium; and when executing data writing into the storage medium, if, in the readout state management table, a readout state associated with a writing address into which data is to be written indicates that readout is not completed, the further steps of:

writing third data into the writing address of the storage medium;

if, in the readout state management table, a readout state associated with the writing address indicates that writing is queued, writing the third data into the writing address of the storage medium;

changing the entry of the readout state management table that is associated with the writing address, to a readout non-completion state;

if, within the readout state management table, the readout state associated with the writing address indicates a readout invalid state, writing the third data into the writing address of the storage medium;

initializing an entry associated with the writing address in the arithmetic operation result management table; and changing an associated entry within the readout state management table to a readout non-completion state with respect to all addresses within the address range specified by the entry associated with the writing address in the arithmetic operation result management table.

The controller, upon receiving the arithmetic operation result readout command issued from the host apparatus, performs the step of setting a step for changing readout states of the addresses defined in the readout state management table, to readout completion states preferentially if all the addresses are not set to denote completion of readout: additionally, for each address ranging from the first address within the arithmetic operation result management table to the last address, repeatedly performs the steps of reading out arithmetic operation results from the entries within the arithmetic operation result management table that are associated with the addresses of the address range, and arithmetically deriving new arithmetic operation results on the entire disk device from the above arithmetic operation results and the previous arithmetic operation results relating to the entire disk device; and after completion of arithmetic operations for all addresses within the arithmetic operation result management table, further transmits the arithmetic operation results on the entire disk device to the host apparatus as a response to the arithmetic operation result readout command.

In a method of inspecting data integrity of a disk array apparatus according to another aspect of the present invention, the disk array apparatus including a plurality of disk devices each provided with a data integrity inspection support function, a buffer for temporary storage, and a disk array controller that issues a writing or reading instruction to the disk devices and to the temporary storage buffer, the disk array controller performs the steps of: reading out independent arithmetic operation results from each of the plural disk devices and recording the results in the temporary storage buffer; calculating new arithmetic operation results on the disk array apparatus by conducting, for each of the independent arithmetic operation results recorded in the temporary storage buffer, arithmetic operations between arithmetic operation results on the disk devices and those of the disk array apparatus; comparing the arithmetic operation results on the disk array apparatus, and an expected value; if comparisons indicate matching, judging that data integrity between the plural disk devices is maintained; and if the comparisons indicate mismatching, judging that data integrity between the plural disk devices is not maintained.

If the comparisons indicate mismatching, the disk array controller performs the steps of: issuing, to each of the plural disk devices, one or plural commands for verifying whether the disk device is in normal operation; receiving a response of the disk device to the singular or plural commands; and judging, by examining the response, whether the disk device is in normal operation. The disk array apparatus may have a console so that judgment results on data integrity or the state existing during the judgment can be displayed at the console. The foregoing arithmetic operations can be exclusive logical summation.

The console may issue an instruction to the disk array controller so that the instruction that specifies a starting address and ending address for calculating arithmetic operation results on the plural disk devices is issued from the disk array controller to each disk device. The console may also issue an instruction to the disk array controller so that the instruction that specifies a data size for calculating arithmetic operation results on the plural disk devices is issued from the disk array controller to each disk device.

The present invention yields the effect that integrity of the data recorded in each disk device mounted in the disk array apparatus can be inspected without consuming an interface band of the disk device and an interface band of a disk connection internal bus of the disk array apparatus.

The present invention also yields the effect that integrity of the data recorded in each disk device mounted in the disk array apparatus can be inspected without consuming a cache memory of the disk array apparatus.

In addition, the present invention yields the effect that integrity of the data recorded in each disk device mounted in the disk array apparatus can be inspected without consuming a calculation resource of the controller of the disk array apparatus.

BRIEF DESCRIPTION OF THE DRAWINGS

FIG. 10 is a diagram showing an example of an arithmetic operation result management table.

FIG. 17 is a diagram showing an example of a console display section of a disk array apparatus according to the present invention.

DETAILED DESCRIPTION OF THE INVENTION

Figure 1:
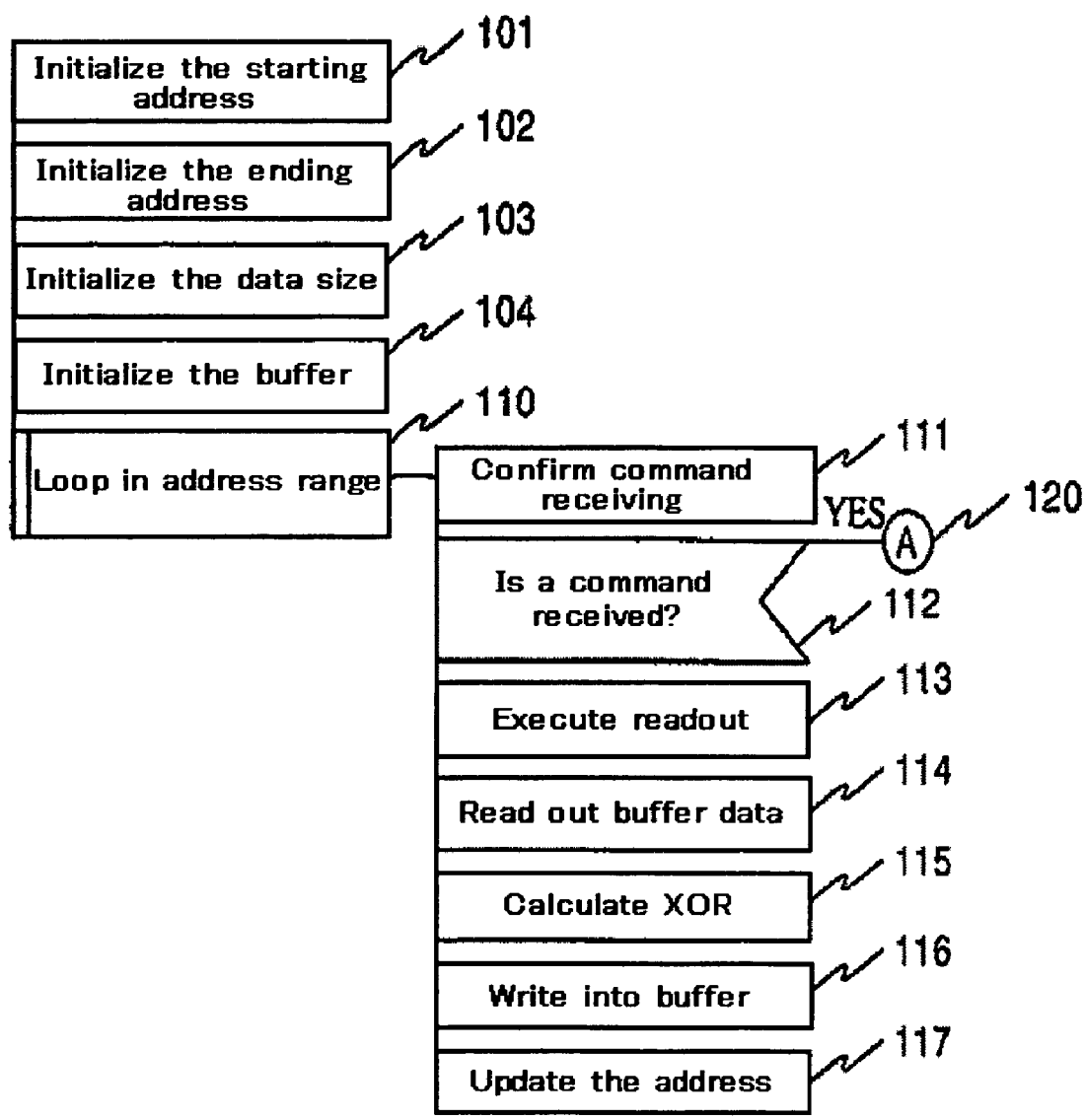
FIG. 1 is a PAD diagram of first-phase arithmetic operations for disk device data integrity inspection based on a first embodiment of a method for supporting data integrity inspection in disk devices according to the present invention.

Specific embodiments of the present invention will be described below with reference to the accompanying drawings. The same reference numerals in each drawing denote the same constituent elements. While the following description of embodiments relates particularly to RAID-5, the invention is also easily applicable to other RAID formats such as RAID-3.

First Embodiment

FIG. 1 is a PAD diagram of first-phase arithmetic operations for disk device data integrity inspection based on a first embodiment of a method for supporting data integrity inspection in disk devices according to the present invention. Reference numeral 101 in FIG. 1 denotes the step of initializing a starting address, 102 the step of initializing an ending address, 103 the step of initializing a data size, and 104 the step of initializing a buffer. Reference numeral 110 denotes a loop in an address range, 111 the step of confirming receipt of a command, 112 the step of inspecting whether the command is being received, 113 the step of reading from a storage medium, and 114 the step of reading from the buffer. Reference numeral 115 denotes the step of conducting an XOR arithmetic operation, 116 the step of writing into the buffer, 117 the step of updating an address, and 120 a subroutine for executing a first command.

Figure 2:
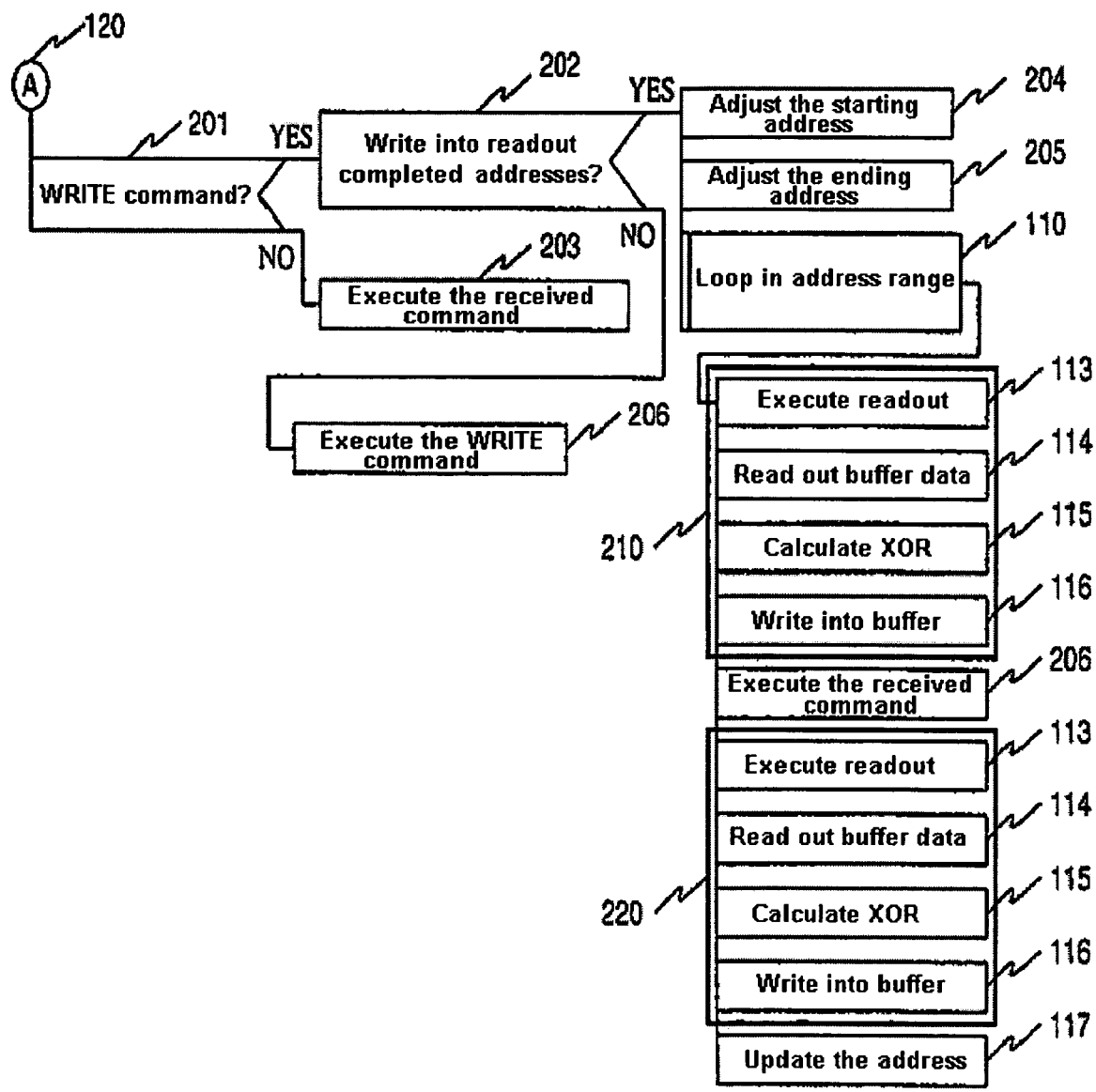
FIG. 2 is a PAD diagram of a subroutine for executing a first command.
Figure 3:
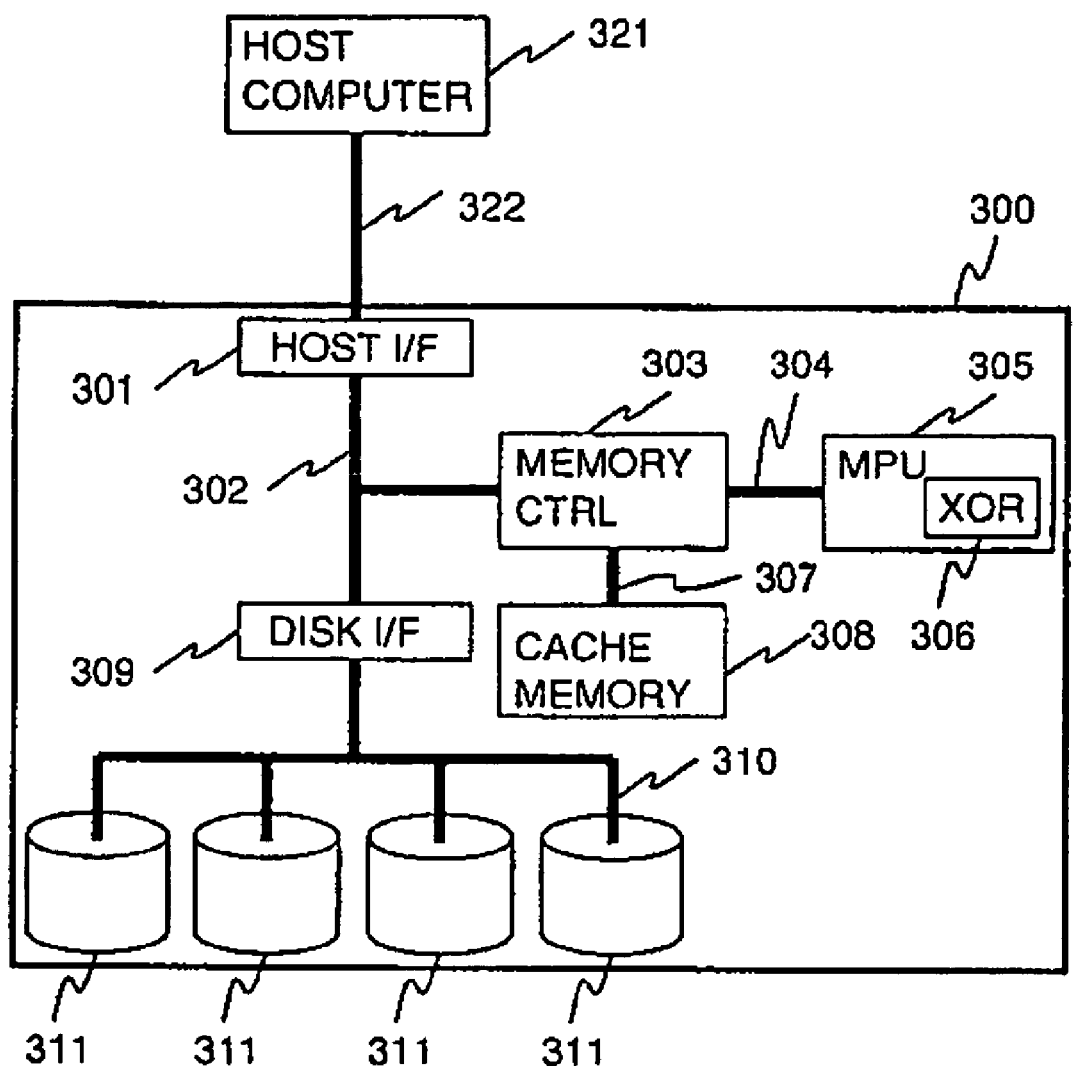
FIG. 3 is a diagram showing the configuration of the conventional disk array apparatus.

FIG. 2 is a PAD diagram of the subroutine for executing the first command. Reference numeral 201 in FIG. 2 denotes the step of inspecting whether the command is a writing command, 202 the step of inspecting whether the command relates to writing into an address from which data has already been read out, and 203 the step of executing the received command. Reference numeral 204 denotes the step of adjusting the starting address, 205 the step of adjusting the ending address, 206 the step of executing the writing command, 210 the step group of conducting arithmetic operations based on existing data, and 220 the step group of conducting arithmetic operations based on the new data obtained by changing the existing data.

Figure 4:
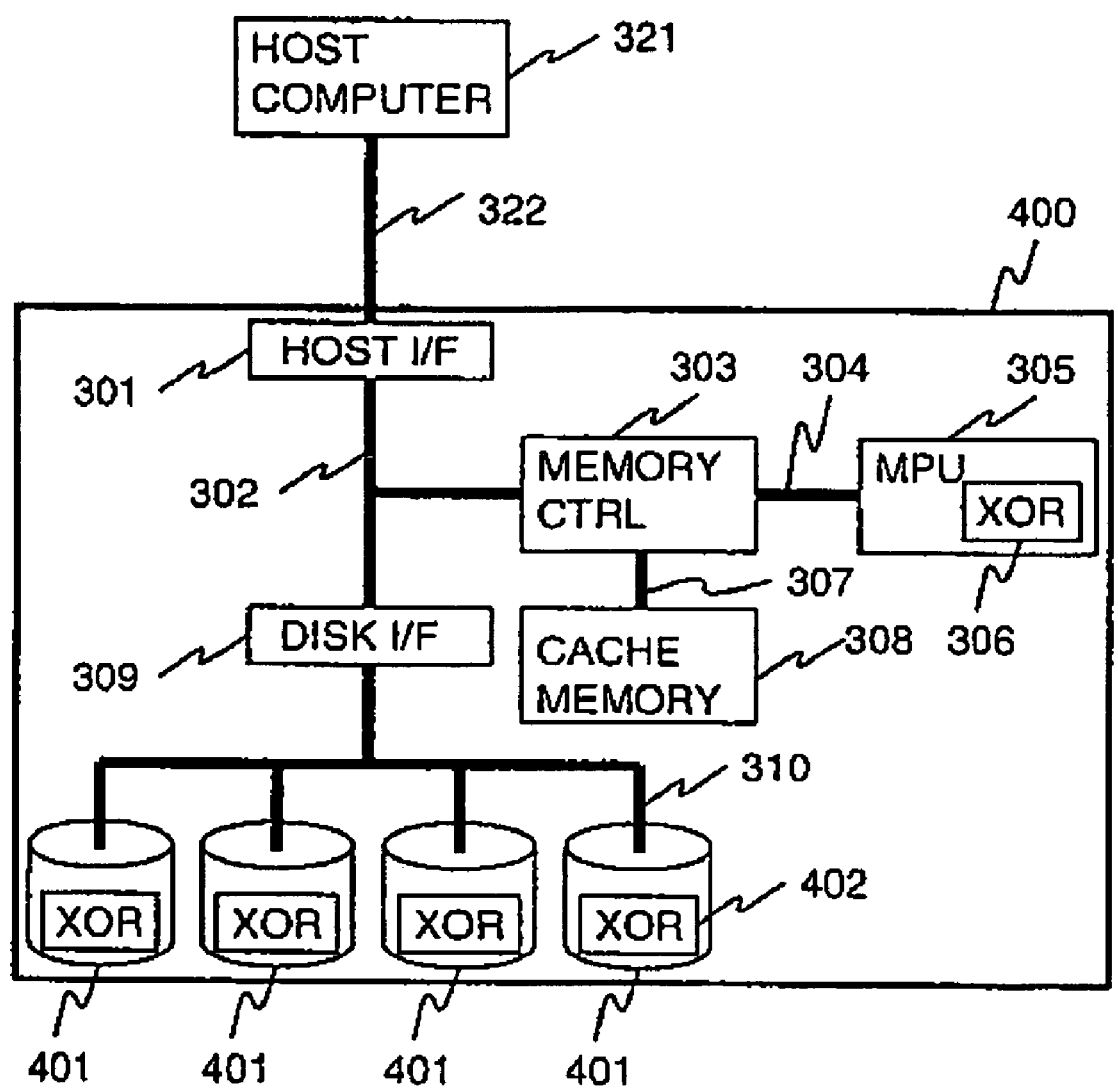
FIG. 4 is a diagram showing a configuration of a disk array apparatus according to the first embodiment of the present invention.
Figure 5:
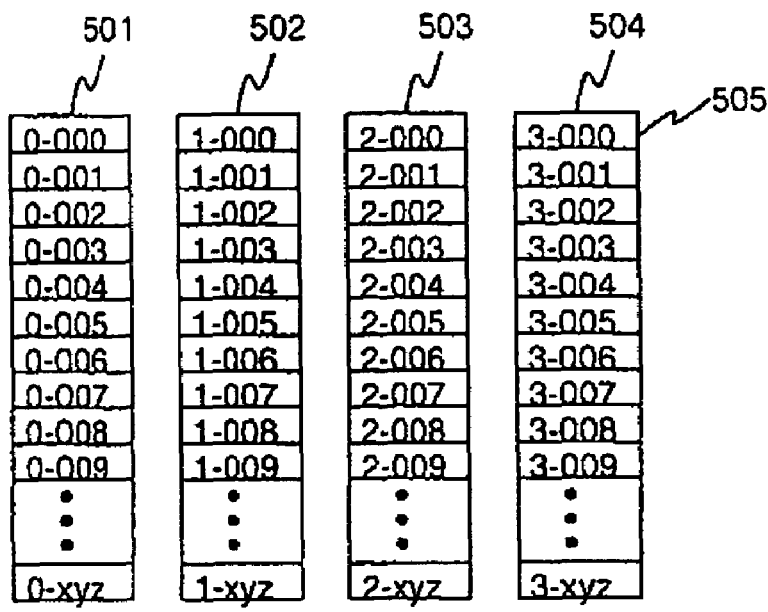
FIG. 5 is a schematic diagram of block addresses in RAID-5.

FIG. 4 is a configuration diagram of a disk array according to the first embodiment of the present invention. Reference numeral 400 in FIG. 4 denotes a disk array apparatus according to the present invention, 401 the disk devices according to the invention, and 402 an XOR operational element built into each disk device.

Figure 6:
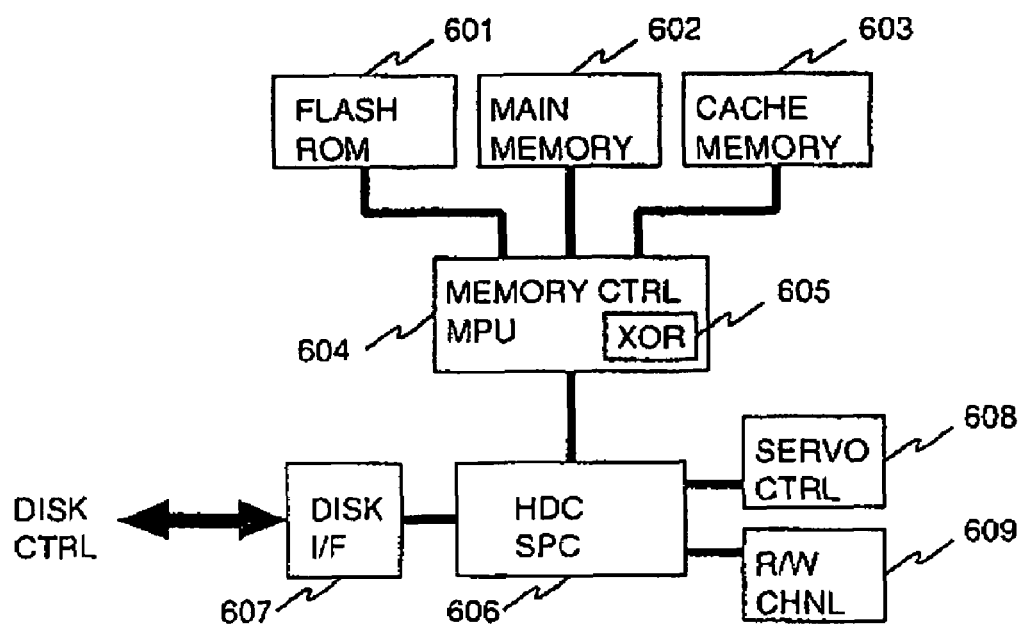
FIG. 6 is a block diagram of a disk device according to the first embodiment of the present invention.

FIG. 6 is a block diagram of a disk device according to the first embodiment of the present invention. Reference numeral 601 in FIG. 6 denotes a flash ROM, 602 main storage, 603 a cache memory, 604 a memory controller and microprocessor, 605 the XOR operational element, 606 a hard disk controller and SCSI protocol controller, 607 a disk interface, 608 a servo controller, and 609 a read/write channel.

The present embodiment is characterized in that data integrity of the disk array apparatus is inspected by conducting arithmetic operations of a first phase in the disk devices built into the disk array apparatus, and then conducting arithmetic operations of a second phase in the disk array apparatus. Conducting the arithmetic operations of the first phase in each disk device is effective in that significant reduction in data traffic can be achieved between the disk device and the controller of the disk array apparatus that uses the disk device connection bus 310.

In conventional disk array apparatus, in order to perform inspections for integrity of the data saved in disk devices, it has been necessary to read out data from all block addresses, perform exclusive OR (XOR) operations, and inspect the data for matching to "Expected Value", an expected value of RAID-5, as in formula (3). "Expected Value" has all its bits set to 0 if parity data is generated with even parity, and has all its bits set to 1 if parity data is generated with odd parity. Inspection of data integrity in a conventional scheme means reading out all data from all disk devices. In a scheme of the present invention, however, arithmetic operations for integrity inspection are, as described below, divided into the arithmetic operations of a first phase that are to be conducted in each disk device, and the arithmetic operations of a second phase that are to be conducted in the disk array apparatus. This reduces the amount of data to be read out from the disk device.

During the arithmetic operations of the first phase, an XOR arithmetic operation is conducted for each block address inside the disk device, as in formula (4), where N is an identifier of the disk device, N-000, ..., N-xyz are block addresses of the disk device of identifier N. For simplicity, data that was stored into a block address of N-abc is also represented as N-abc. The value obtained from the arithmetic operation is taken as N-XOR. An expected value or regularity does not exist in the value of N-XOR.

[Formula 4]

$$N\text{-}XOR = N\text{-}000 \oplus N\text{-}001 \oplus N\text{-}002 \oplus \ldots \oplus N\text{-}xyz \quad (4)$$

During the arithmetic operations of the second phase, XOR-XOR that is an exclusive logical sum between the arithmetic operation results obtained inside each disk device is calculated as in formula (5). An expected value of XOR-XOR is a value obtained by repeating exclusive logical product calculation of "Expected Value" as often as there actually are block addresses in the disk device.

[Formula 5]

$$XOR\text{-}XOR = 0\text{-}XOR \oplus 1\text{-}XOR \oplus 2\text{-}XOR \oplus 3\text{-}XOR \quad (5)$$

In the scheme of the present invention, only N-XOR data is transferred from the disk device to the disk array controller. For example, for a disk device capacity of 100 GB and a block size of 4 KB, 100-GB data must be transferred in the conventional scheme, whereas, in the scheme of the present invention, only 4-KB data needs to be transferred. This means that the amount of data to be transferred can be reduced to 4 KB/100 GB=¹⁄₂₅ M.

A configuration of a disk device according to the present invention will be described below with reference to FIG. 6. Control programs for the disk device, and the first-phase arithmetic operation program described later are stored into the flash ROM 601. These programs are unfolded in the main storage 602 after a power supply has been turned on. In the main storage 602, the various programs stored within the flash ROM 601 are unfolded and various parameter assignments from the controller of the disk array apparatus, such as the host apparatus, are stored. The memory controller and microprocessor (MPU) 604 is the disk device controller. The microprocessor uses the stored programs and parameters within the main storage 602 to conduct a read/write operation and other normal operations on the disk device, and to conduct the arithmetic operations of the first phase. The cache memory 603 is used not only as a temporary storage location for the data read out or written in, but also as a saving location for interim results on the arithmetic operations of the first phase. The disk interface 607 is used for data exchange with the host apparatus such as the controller of the disk array apparatus. The parameters saved in the main storage 602 are also transferred from the host apparatus, through the disk interface 607, to the disk device. The hard disk controller (HDC) and the SCSI protocol controller (SPC) 606 interpret the protocol used for communication with the host apparatus, and control the servo controller 608 and read/write channel 609 required for data reading from/writing into the storage medium of the disk device. For example, when writing in data from the host apparatus, after the disk interface 607 has received a command, the SPC records in the cache memory 603 via the memory controller the data within the received command that is to be written into the storage medium, and notifies the MPU of the fact that the writing command has been received. The MPU instructs the HDC to write the recorded data within the cache memory 603 into what addresses (sectors), and the HDC controls the servo controller 608 and the read/write channel 609 to execute writing onto the storage medium. The XOR operational element 605 conducts a necessary XOR operation during the arithmetic operations of the first phase.

FIG. 4 is a configuration diagram of the disk array apparatus 400 which uses the disk devices according to the present invention. The disk array apparatus 400 differs from the disk array apparatus 300 of the conventional scheme in that the apparatus 400 contains the disk devices 401 of the present invention, instead of the conventional disk devices 311, and in that the apparatus 400 contains a program for conducting arithmetic operations of a second phase. This program is unfolded in the main storage (not shown) of the disk array apparatus controller.

A method of conducting the arithmetic operations of the first phase is described below with reference to FIGS. 1 and 2.

In step 101, a starting sector address of the arithmetic operations of the first phase is specified. On completion of step 101, control proceeds to step 102. In step 102, an ending sector address of the arithmetic operations of the first phase is specified. On completion of step 102, control proceeds to step 103. In step 103, a block size of RAID-5 is specified. For RAID-5, since specific parity data is generated for each block size such as 4 KB or 8 KB, the same block size as used in the RAID-5 configuration of the disk array apparatus is also specified for the arithmetic operations of the first phase. On completion of step 103, control proceeds to step 104.

A value of the starting sector address, a value of the ending sector address, and a value of the block size are specified from a console of the disk array apparatus by an administrator thereof. The console notifies the three values to the controller of the disk array apparatus. The controller of the disk array apparatus then writes the values into the main storage 602 of each disk device via the disk interface 607 by means of a vendor-unique command, S.M.A.R.T., or the like. If neither the starting sector address nor the ending sector address is specified, the disk device uses the first sector address and last sector address thereof, as its initial data. If the block size is not specified, significant arithmetic operations cannot be conducted. Therefore, the arithmetic operations of the first phase are not started until a block size has been specified.

In step 104, a region for saving interim results on the arithmetic operations of the first phase is reserved in the cache memory 603 according to the block size specified in step 103, and the region is initialized. On completion of step 104, control proceeds to loop 110. In loop 110, the process steps below are repeated in a range from the starting sector address that was specified in step 101, to the ending sector address that was specified in step 102. First, control proceeds to step 111. In step 111, it is confirmed whether a command has been received from the controller of the disk array apparatus. On completion of step 111, control proceeds to step 112. In step 112, the presence or absence of a received command is inspected. If a command has been received, control proceeds to subroutine 120. On completion of step 112, control proceeds to step 113. In step 113, data of the block size that was specified in step 103 is read out from the current readout sector addresses of data integrity inspection, within the storage medium of the disk device. On completion of step 113, control proceeds to step 114. In step 114, interim results on the arithmetic operations are read out from the saving region of the interim results. On completion of step 114, control proceeds to step 115. In step 115, an XOR arithmetic operation is conducted between data that has been read out from the storage medium, and the interim results that have been read out from the saving region. This step is equivalent to the fact that the step of formula (4) is performed in the loop. On completion of step 115, control proceeds to step 116. In step 116, the interim results that were calculated in step 115 are written back into the saving region in provision for the next arithmetic operations. On completion of step 116, control proceeds to step 117. In step 117, the sector addresses are advanced according to the particular block size, for the next arithmetic operations.

In subroutine 120, it is first inspected whether the command from the controller of the disk array apparatus is a writing command. If the command is a writing command, control proceeds to step 202, or if the command is not a writing command, control proceeds to step 203. In step 202, it is inspected whether an address for which the writing command is to be executed was already read out in step 113. If the writing command was already read out, control proceeds to step 204, or if the command is not yet read out, control proceeds to step 206. In this way, an execution procedure on the process is changed, depending on whether the address has been read out. This ensures that when data is overwritten on the sector that has completed the XOR arithmetic operation, correct arithmetic operation results can be obtained.

Step 204 is a step for specifying a temporary starting sector address. If the writing address is offset from a boundary of the block size, the sector address is normalized, in this step, for matching to the boundary of the block size. On completion of step 204, control proceeds to step 205. A temporary ending sector address is specified in step 205. The sector address is normalized similarly to step 204. On completion of step 205, control proceeds to loop 110. In loop 110, the process steps below are repeated in a range from the starting sector address that was specified in step 204, to the ending sector address that was specified in step 205. First, control proceeds to step 113. In step 113, the specified block size of data is read. On completion of step 113, control proceeds to step 114. In step 114, interim results are read out from the saving region thereof. On completion of step 114, control proceeds to step 115. In step 115, an XOR arithmetic operation is conducted between data that has been read out from the storage medium, and the interim results that have been read out from the saving region. On completion of step 115, control proceeds to step 116. In step 116, the interim results that were calculated in step 115 are written back into the saving region in provision for the next arithmetic operations. Step group 210 for conducting arithmetic operations with existing data is performed to make previous XOR calculation results invalid. On completion of step 116, control proceeds to step 206. In step 206, the received writing command is executed in its intended address range. Although a very large data size, compared with the block size, can be specified in the writing command, if such a great amount of writing is conducted at a time, this will make it impossible to conduct the XOR arithmetic operation. Data is therefore split according to the block size. Only the addresses specified in the writing command are used during the normalization when the starting sector address and the ending sector address are adjusted. On completion of step 206, control proceeds to step 113. In step 113, data equivalent to the block size from the intended sector addresses is read out. On completion of step 113, control proceeds to step 114. In step 114, interim results are read out from the saving region thereof. On completion of step 114, control proceeds to step 115. In step 115, an XOR arithmetic operation is conducted between data that has been read out from the storage medium, and the interim results that have been read out from the saving region. On completion of step 115, control proceeds to step 116. In step 116, the interim results that were calculated in step 115 are written back into the saving region in provision for the next arithmetic operations. Step group 220 for conducting arithmetic operations using the data obtained after changing is performed to conduct XOR arithmetic operations using newly written data. On completion of step 116, control proceeds to step 117. In step 117, the sector addresses are advanced according to the particular block size, for the next arithmetic operations.

If the inspection results in step 202 indicate that the address is not yet read out, control proceeds to step 206, in which step the writing command is then executed intact since, when the address is not yet read out, there is no need to make the XOR arithmetic operation invalid.

If the command in step 201 is not a writing command, control proceeds to step 203. In step 203, a command not affecting the XOR arithmetic operation is executed as it is.

When loop 110 of FIG. 1 is completed, the fact that the arithmetic operations of the first phase have been completed is notified to the controller of the disk array apparatus by means of S.M.A.R.T. or the like. The controller of the disk array apparatus uses S.M.A.R.T., a vendor-unique command, or the like, to read out results of the arithmetic operations of the first phase. The amount of data read out at this time is a block size. The readout is followed by execution of the second-phase arithmetic operations of formula (5) by the XOR operational element 306 using the data read out from each disk device. After that, XOR-XOR that is the resulting arithmetic operation results is compared with an expected value. This expected value has all its bits set to 0 or 1, depending on the number of block addresses inside the disk device. If XOR-XOR agrees with the expected value, this indicates that data integrity in the disk array apparatus is maintained, in which case, a message indicating that data integrity is maintained is displayed at the console of the disk array apparatus. If XOR-XOR does not agree with the expected value, since this indicates that data integrity in the disk array apparatus is not maintained, a message indicating that data integrity is not maintained is displayed at the console of the disk array apparatus.

FIG. 17 is a diagram showing an example of the display made at the console of the disk array apparatus when the disk devices calculate arithmetic operation results for each block address group.

In the figure, IDs of each block group are displayed in a field 1711. Also, whether results of the arithmetic operations conducted in the disk array apparatus from arithmetic operation results on the block groups of each disk device match an expected value is displayed on a field 1712. At the field 1712, OK denotes matching to the expected value, NG denotes mismatching to the expected value, and N/A denotes that an arithmetic operation is not being conducted in the disk device or the disk array apparatus.

IDs of each disk device are displayed in a field 1721. Diagnostic results on the disk device are displayed in a field 1722. In the field 1722, OK denotes normality, NG a failure, and WARN a warning. A failure mode is displayed in a field 1723. "Write head failure" indicates a failure in a write head, and "Retry threshold" indicates that a retry count in the disk device has reached a threshold value.

The disk device can perform calculations for each address range and return arithmetic operation results on the entire disk device. Alternatively, the disk device can return interim results for each calculated-data address range intact to the disk array apparatus. In the example of FIG. 17, interim results for each address range are returned to the disk array apparatus as they are. Since the interim results are returned, the arithmetic operations may not be completed, depending on the particular address range. In that case, N/A is displayed in the field 1712.

If data integrity is not maintained, since a failure is occurring in either disk device, the disk device controller diagnoses each disk device. A diagnosing method is by, for example, issuing a diagnosing command or carrying out read and write operations and confirming whether data is written properly.

The disk device can start executing the arithmetic operations of the first phase voluntarily or in accordance with an instruction from the host apparatus. A vendor-unique command, S.M.A.R.T., or the like can be used as such an instruction.

In the first embodiment, the first-phase arithmetic operations for data integrity inspection are conducted inside the disk device. The disk device and the host apparatus are connected with each other by a bus formed of SCSI, FC-AL, or the like, and the disk device and the host apparatus cannot communicate with each other at a desired time, even when necessary. Since the arithmetic operations of the first phase are conducted utilizing such a time during which a command is not sent from the host apparatus, performance deterioration due to the arithmetic operations of the first phase does not exist when viewed from the host apparatus. In addition, since the amount of data to be transmitted to the host apparatus after the arithmetic operations of the first phase have been conducted is a block size, almost no interface band of the disk device is consumed and the time required for data transfer is also short.

Second Embodiment

In the first embodiment, when a command is sent from the host apparatus to the disk device, the command is executed with highest priority in the disk device. However, in a second embodiment described below, a priority level of a received command is identified and then a decision is made as to whether arithmetic operations of a first phase or the command are to undergo preferential processing. Differences from the first embodiment are described hereunder.

Figure 7:
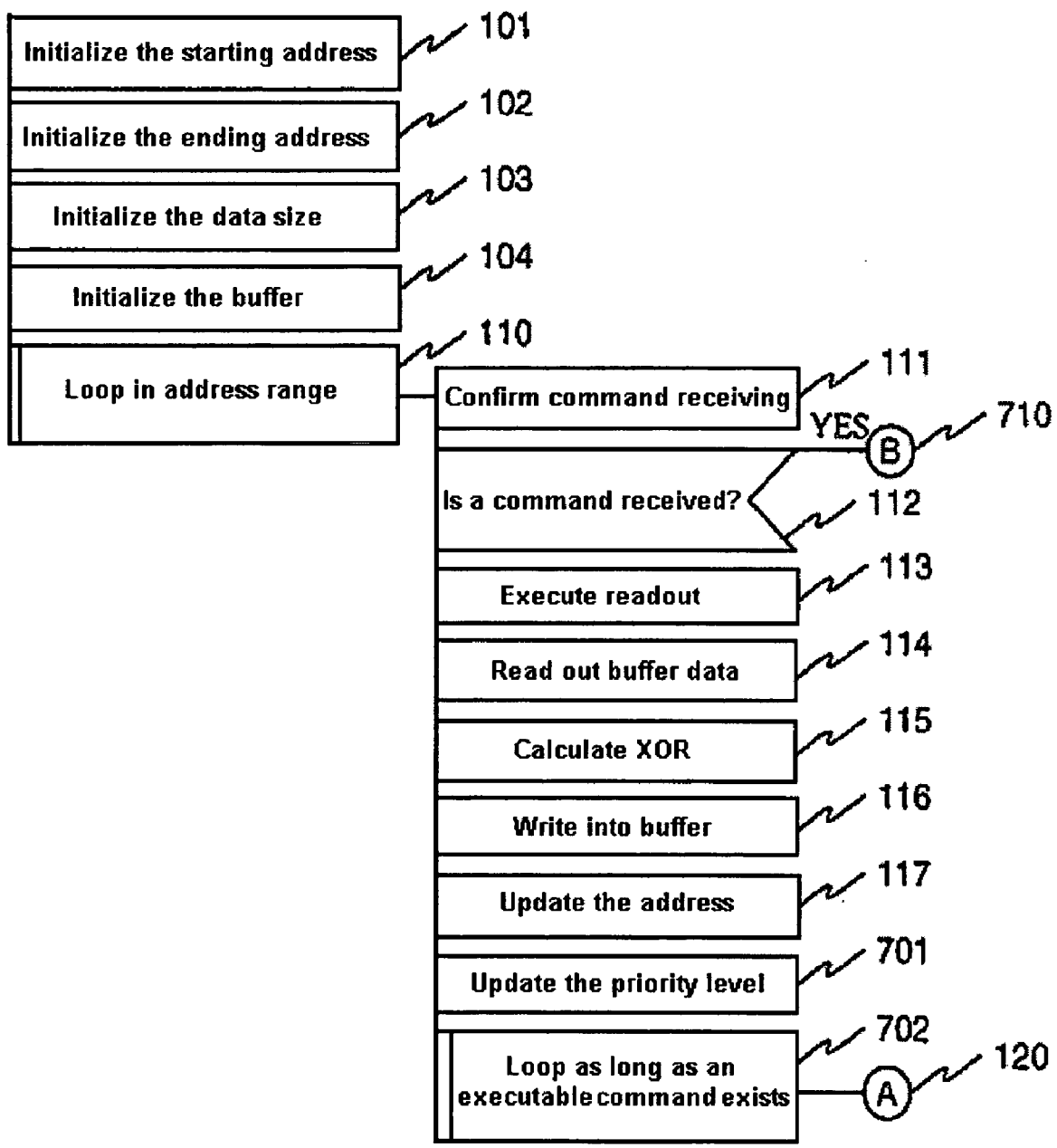
FIG. 7 is a PAD diagram of first-phase arithmetic operations for disk device data integrity inspection based on a second embodiment of a method for supporting data integrity inspection in disk devices according to the present invention.

FIG. 7 is a PAD diagram of first-phase arithmetic operations for disk device data integrity inspection based on the second embodiment of a method for supporting data integrity inspection in disk devices according to the present invention. Reference numeral 701 in FIG. 7 denotes the step of updating a priority level, 702 a loop that iterates as often as there actually is a command executable with a current setting of the priority level, and 710 a subroutine for confirming receipt of a first command.

Figures 8, 9:
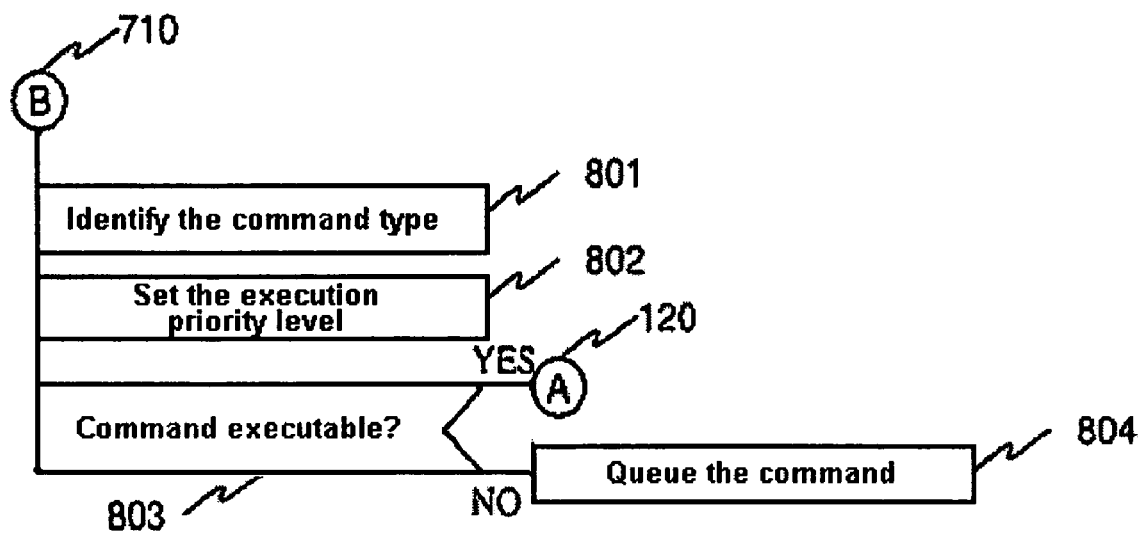
FIG. 8 is a PAD diagram of a subroutine for confirming receipt of a first command.
FIG. 9 is a diagram showing an example of a readout state management table.

FIG. 8 is a PAD diagram of the subroutine for confirming receipt of the first command. Reference numeral 801 in FIG. 8 denotes the step of identifying the type of received command, 802 the step of setting a priority level for the received command, 803 the step of inspecting whether the received command is immediately executable in accordance with the set priority level, and 804 the step of queuing the received command.

In the first embodiment, after command receiving, subroutine 120 for executing a first command is executed in step 112, whereas, in the second embodiment, subroutine 710 for confirming receipt of the first command is executed. In subroutine 710, the command, if high in urgency level, is immediately executed. The command is queued if it is not high in urgency level.

In subroutine 710, control proceeds to step 801 first. The type of received command is identified in step 801. On completion thereof, control proceeds to step 802. In step 802, a priority level for the received command is set, subject to the policy set in the disk device. For example, this policy is set so that whereas readout commands will be executed with highest priority to prevent processing in the host apparatus from being stopped by delayed execution of the readout commands, writing commands will be reduced in priority level since delayed execution of the writing commands will not stop processing in the host apparatus. Such a policy can have its default value set prior to shipping of the disk devices. Instead of this, the policy can likewise be set using the vendor-unique command, S.M.A.R.T., or the like sent from the host apparatus such as the controller of the disk array apparatus. On completion of step 802, control proceeds to step 803. In step 803, the priority level that was set in step 802 is examined and whether the received command requires immediate execution is inspected. When it is necessary to execute the command immediately, control proceeds to subroutine 120, in which the command is then executed. If immediate execution is unnecessary, control proceeds to step 804. In step 804, the command is queued and preparations are conducted for its delayed execution.

The procedure from subroutine 112 of FIG. 7 to step 117 is the same as for the first embodiment. On completion of step 117, control proceeds to step 701. In step 701, priority levels of queued commands are re-evaluated and a process for raising the priority levels follows. The priority level raise process guarantees that the queued commands will be executed without fail. On completion of step 701, control proceeds to step 702. In step 702, while there are commands whose execution has been made possible by the re-evaluation of their priority levels, these commands are executed in accordance with subroutine 120.

The priority level at which the arithmetic operations of the first phase are to be conducted can be changed using the vendor-unique command, S.M.A.R.T., or the like sent from the host apparatus. For example, if the controller of the disk array apparatus needs arithmetic operation results of the first phase, it is possible to specify that the arithmetic operations of the first phase in the disk device be conducted with the highest priority.

In the first embodiment, a command from the host apparatus is executed with the highest priority. In the second embodiment, however, priority levels are re-evaluated and order of execution of commands is changed. An apparatus such as this is high in affinity with SCSI, FC-AL, SAS, SATA, and other protocols having a command queue.

Third Embodiment

In the first and second embodiments, the arithmetic operations of the first phase are conducted from the first sector address within the disk device, toward the last sector address. In a third embodiment described hereunder, however, arithmetic operations of a first phase can be conducted in arbitrary order by managing how far the arithmetic operations have progressed in a particular disk device. Differences from the first embodiment and from the second embodiment are described below.

FIG. 9 is a readout state management table. Reference numeral 901 in FIG. 9 denotes block addresses, and 902 denotes readout states.

Figure 11:
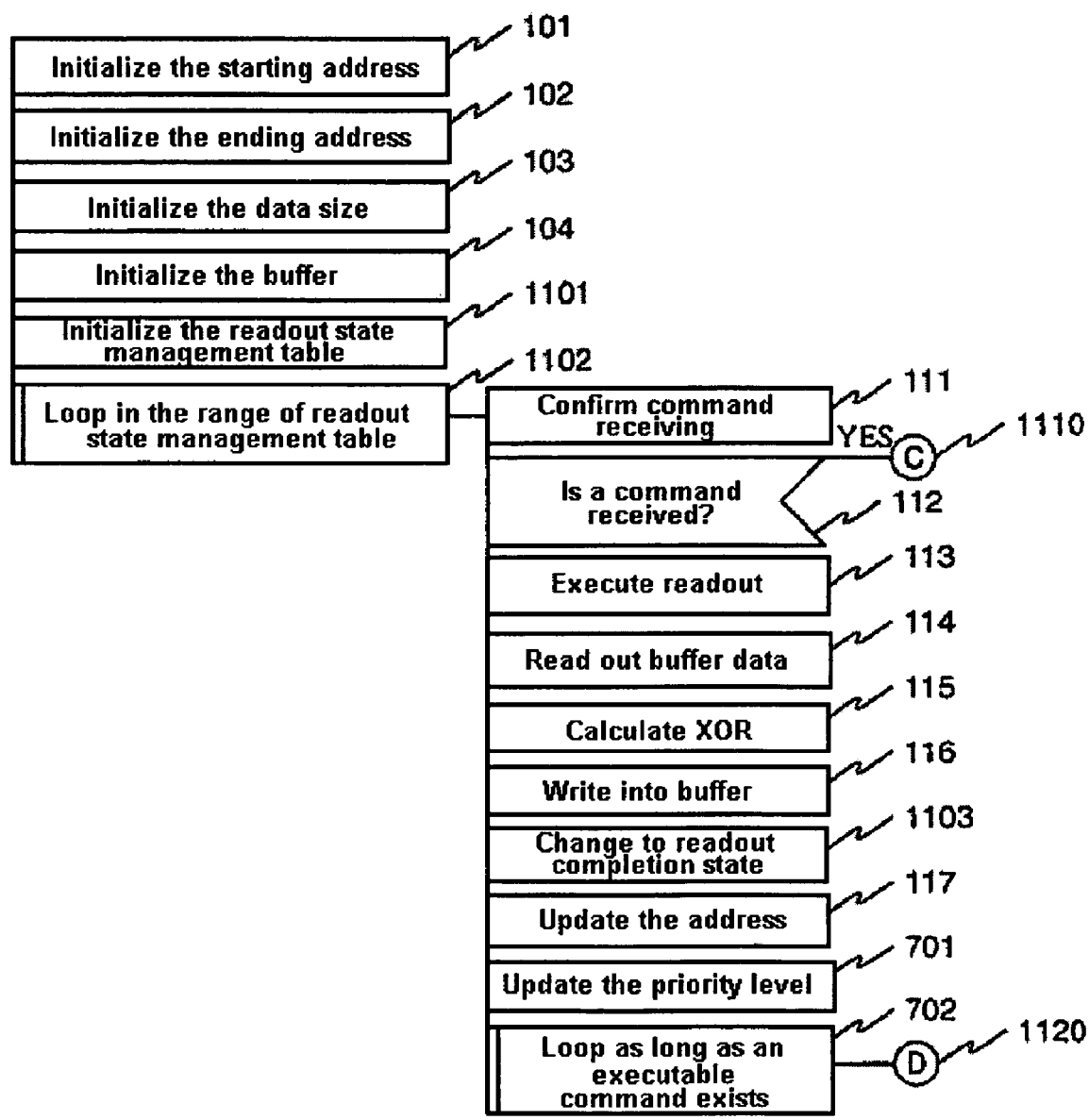
FIG. 11 is a PAD diagram of first-phase arithmetic operations for disk device data integrity inspection based on a third embodiment of a method for supporting data integrity inspection in disk devices according to the present invention.

FIG. 11 is a PAD diagram of first-phase arithmetic operations for disk device data integrity inspection based on the third embodiment of a method for supporting data integrity inspection in disk devices according to the present invention. Reference numeral 1101 in FIG. 11 denotes the step of initializing the readout state management table, 1102 a loop that is repeatedly executed until all states listed in the readout state management table have been changed to readout completion states. Reference numeral 1103 denotes the step of changing a readout state to a readout completion state, 1110 a subroutine for confirming receipt of a second command, and 1120 a subroutine for executing the second command.

Figure 12:
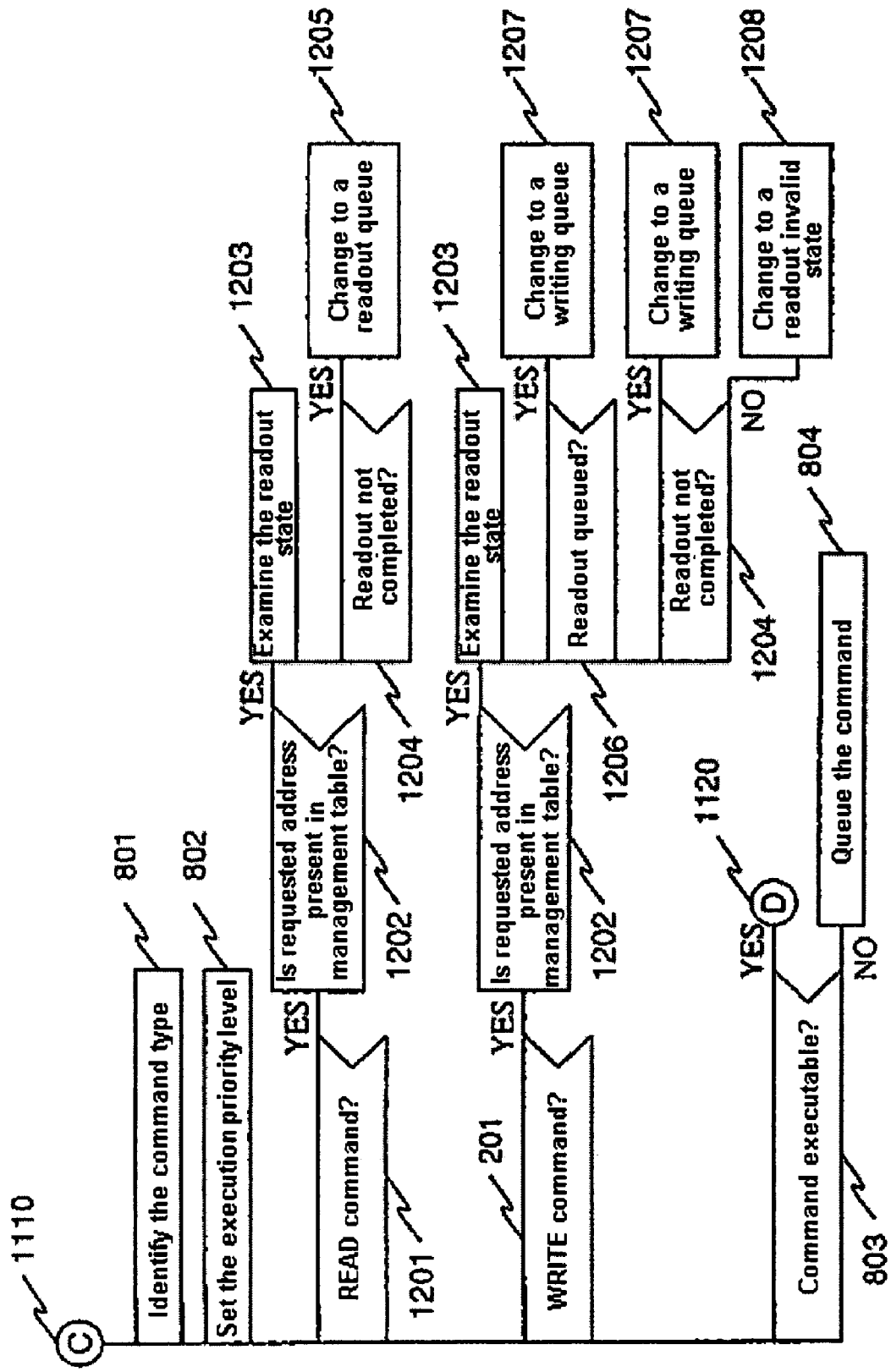
FIG. 12 is a PAD diagram of a subroutine for confirming receipt of a second command.

FIG. 12 is a PAD diagram of the subroutine for confirming receipt of the second command. Reference numeral 1201 in FIG. 12 denotes the step of inspecting whether the command is a readout command, 1202 the step of inspecting whether the address requested by the command is present in the readout state management table, 1203 the step of reading out a readout state from the readout state management table, and 1204 the step of inspecting whether the readout state indicates that readout is completed. Reference numeral 1205 denotes the step of changing the readout state to a readout reservation, 1206 the step of inspecting whether the readout state indicates that the readout is reserved, 1207 the step of changing the readout state to a writing reservation, and 1208 the step of changing the readout state to a readout invalid state.

Figure 13:
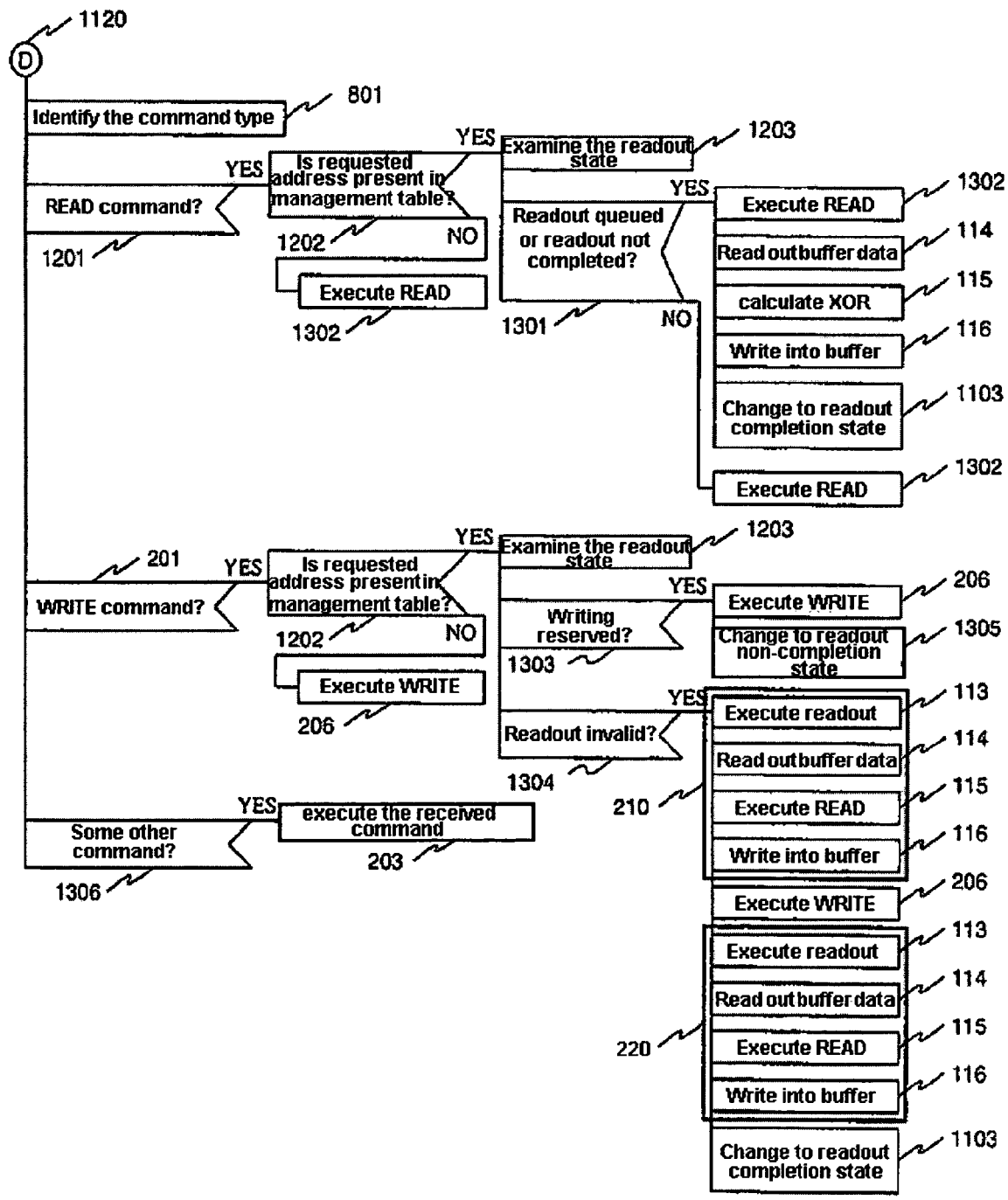
FIG. 13 is a PAD diagram of a subroutine for executing the second command.

FIG. 13 is a PAD diagram of the subroutine for executing the second command. Reference numeral 1301 in FIG. 13 denotes the step of inspecting whether the readout state indicates that readout is reserved or that the readout is not completed, 1302 the step of executing a readout command, and 1303 the step of inspecting whether the readout state indicates that writing is reserved. Reference numeral 1304 denotes the step of inspecting whether the readout state indicates that the readout is invalid, 1305 the step of changing the readout state to a readout non-completion state, and 1306 the step of inspecting whether the command is other than a readout command or a writing command.

In the present embodiment, how far the arithmetic operations of the first phase have progressed in the disk device is managed per readout state management table. Accordingly, the arithmetic operations of the first phase can also be conducted when data is to be read out from the storage medium in accordance with a readout command from the controller of the disk array apparatus. On the readout state management table, readout states are managed, in such a format as denoted by 901, for each block address into which a region within the storage medium of the disk device was split according to block size. As listed at 902, there are five types of readout states: readout not completed (NONE), readout completed (READ), a readout queued (R-QUE), writing queued (W-QUE), and readout invalid (DIRTY). The readout state management table is reserved in the cache memory 603 of the disk device or on the storage medium. Which of the two reserving locations will be actually used depends on a necessary region size of the readout state management table and on a capacity of the cache memory 603.

Unlike the first and second embodiments, the third embodiment uses the readout state management table and thus needs the step 1101 of initializing the readout state management table. In step 1101, a region of the readout state management table is reserved in the cache memory 603 or on the storage medium, block addresses 901 are initialized using the starting sector address, the ending sector address, and the block size, and all readout states 902 are set to be readout non-completion states (NONE). The first and second embodiments employ loop 110 to make the program loop in the range from the starting sector address to the ending sector address. In contrast, the third embodiment uses loop 1102 to make the program loop in arbitrary order until all readout states 902 in the readout state management table have been changed to readout completion states (READ).

In the second embodiment, after command receiving, subroutine 710 that confirms receipt of a first command is executed in step 112. In the third embodiment, however, subroutine 1110 that confirms receipt of a second command is executed in step 112. In subroutine 1110, reference to the readout state management table and registration of states are conducted in addition to identification of a priority level of the command. In the second embodiment, subroutine 120 for executing the second command is executed in loop 702, whereas, in the third embodiment, subroutine 1120 for executing the first command is executed. In subroutine 1120, a command execution method is changed according to the readout state management table and the states listed therein are updated. In the first and second embodiments, writing into the buffer in step 116 is followed by address updating in step 117. In the third embodiment, however, since what blocks were read is managed using the readout state management table, control proceeds to step 1103 after executing step 116. In step 1103, readout states of blocks are changed to readout completion states. On completion of step 1103, control proceeds to step 117. Next, operational description of subroutines 1110 and 1120 is given below.

In subroutine 1110, the type of command received is identified in step 801 first and then control proceeds to step 802. In step 802, an execution priority level of the received command is set from the type thereof, and then control proceeds to step 1201. Step 1201 is performed to inspect whether the received command is a readout command. If the command is a readout command, control proceeds to step 1202. On completion of step 1201, control proceeds to step 201.

Step 1202 is performed to inspect whether the address requested by the readout command is present in the readout state management table. Execution of this inspection allows the program to appropriately operate when it conducts first-phase arithmetic operations only for a specific region of the disk device, not conducting first-phase arithmetic operations for all regions at the same time in order to inspect data integrity. When the block address is present in the readout state management table, control proceeds to step 1203. Readout states 902 in the readout state management table are read out in step 1203. On completion of step 1203, control proceeds to step 1204. Whether the particular readout state is indicative of a readout non-completion state is inspected in step 1204. If readout is not completed, control proceeds to step 1205. In step 1205, the readout state 902 of the corresponding block address is changed to a readout reservation.

Step 201 is performed to inspect whether the received command is a writing command. If the command is a writing command, control proceeds to step 1202. On completion of step 201, control proceeds to step 803.

Step 1202 is performed to inspect whether the address requested by the writing command is present in the readout state management table. When the block address is present in the readout state management table, control proceeds to step 1203. Readout states 902 in the readout state management table are read out in step 1203. On completion of step 1203, control proceeds to step 1206. Whether the particular readout state indicates that readout is reserved is inspected in step 1206. If the readout is reserved, control proceeds to step 1207. In step 1207, the readout state 902 of the corresponding block address is changed to a writing reservation. On completion of step 1206, control proceeds to step 1204. Whether the particular readout state is indicative of a readout non-completion state is inspected in step 1204. If readout is not completed, control proceeds to step 1207. If readout is completed, control proceeds to step 1208. In step 1207, the readout state 902 of the corresponding block address is changed to a writing reservation. In step 1208, the readout state 902 of the corresponding block address is changed to a writing invalid state.

Step 803 is performed to examine the priority level that was set in step 802, and then inspect whether the received command needs to be immediately executed. If the command requires immediate execution, control proceeds to subroutine 1210, in which step, the command is then executed. If the command does not require immediate execution, control proceeds to step 804, in which step, the command is then queued and preparations are conducted for delayed execution of the command.

In subroutine 1120, the type of command is identified in step 801 first and then control proceeds to step 1201. In step 1201, whether the type of command is indicative of a readout command is inspected. If the command is a readout command, control proceeds to step 1202. On completion of step 1201, control proceeds to step 201. Step 1202 is performed to inspect whether the address requested by the readout command is present in the readout state management table. When the address is present, control proceeds to step 1203. If the address is not present, control proceeds to step 1302, in which step, the readout command is then executed. Associated readout state 902 in the readout state management table is read out in step 1203. On completion of step 1203, control proceeds to step 1301. Whether the readout state 902 that has been read out is indicative of a readout queue or a readout non-completion state is inspected in step 1301. Conditional judgment results in step 1301 indicate a true state when the block address that the readout command from the host apparatus reads out is subjected to the arithmetic operations of the first phase. For this reason, the arithmetic operations of the first phase are also conducted during processing of the readout command. If the conditional judgment results in step 1301 indicate a false state, the readout command is only executed in step 1302. If the conditional judgment results in step 1301 indicate a true state, the steps below are performed. First, the readout command is executed in step 1302, and then control proceeds to step 114. In step 114, interim results are read out from the saving region of arithmetic operation interim results, and control proceeds to step 115. In step 115, an XOR arithmetic operation is conducted between data that was read out from the storage medium in step 1302, and the interim results that were read out in step 114, and then control proceeds to step 116. In step 116, results of the XOR arithmetic operation are written back into the saving region of the arithmetic operation interim results, and then control proceeds to step 1303. In step 1303, the associated state in the readout state management table is changed to readout completion.

In step 201, whether the type of command is indicative of a writing command is inspected, and if the command is a writing command, control proceeds to step 1202. On completion of step 201, control proceeds to step 1306. In step 1202, it is inspected whether the address requested by the writing command is present in the readout state management table. When the address is present, control proceeds to step 1203. If the address is not present, control proceeds to step 206, in which step, the writing command is then executed. Associated readout state 902 in the readout state management table is read out in step 1203. On completion of step 1203, control proceeds to step 1303. Whether the readout state is indicative of a writing queue is inspected in step 1303. If conditional judgment results in step 1303 indicate a true state, the readout command is executed in step 206 and control proceeds to step 1305. In step 1305, the associated state in the readout state management table is changed from the writing queue to a readout non-completion state, whereby conducting the first-phase arithmetic operations for a block address into which data was written can be guaranteed. On completion of step 1303, control proceeds to step 1304. Whether the readout state indicates that readout is invalid is inspected in step 1304. The conditional judgment results in step 1304 indicate a true state when writing is executed for the block address on which the arithmetic operations of the first phase has already been performed. Accordingly, when the conditional judgment results in step 1304 indicate a true state, the command is executed in step group 210, step 206, and step group 220, in that order, similarly to the first embodiment. On completion of step group 220, control proceeds to step 1103. In step 1103, since the arithmetic operations of the first phase have been performed, the associated readout state in the readout state management table is changed to readout completion.

Whether the received command is other than a readout command or a writing command is inspected in step 1306. If conditional judgment results in step 1306 indicate a true state, control proceeds to step 203, in which step, the received command is then executed.

Fourth Embodiment

The number of sets of data saved as interim results on the arithmetic operations of the first phase is only one in each of the first to third embodiments. In a fourth embodiment described hereunder, a block address is split into multiple regions and independent interim results are saved in each region. The fourth embodiment differs from the third embodiment in that multiple sets of first-phase arithmetic operation results are saved. This difference is described in detail below.

FIG. 10 is an arithmetic operation result management table. Reference numeral 1001 in FIG. 10 denotes group IDs assigned to block address groups, and 1002 denotes interim results on first-phase arithmetic operations for each group ID.

Figure 14:
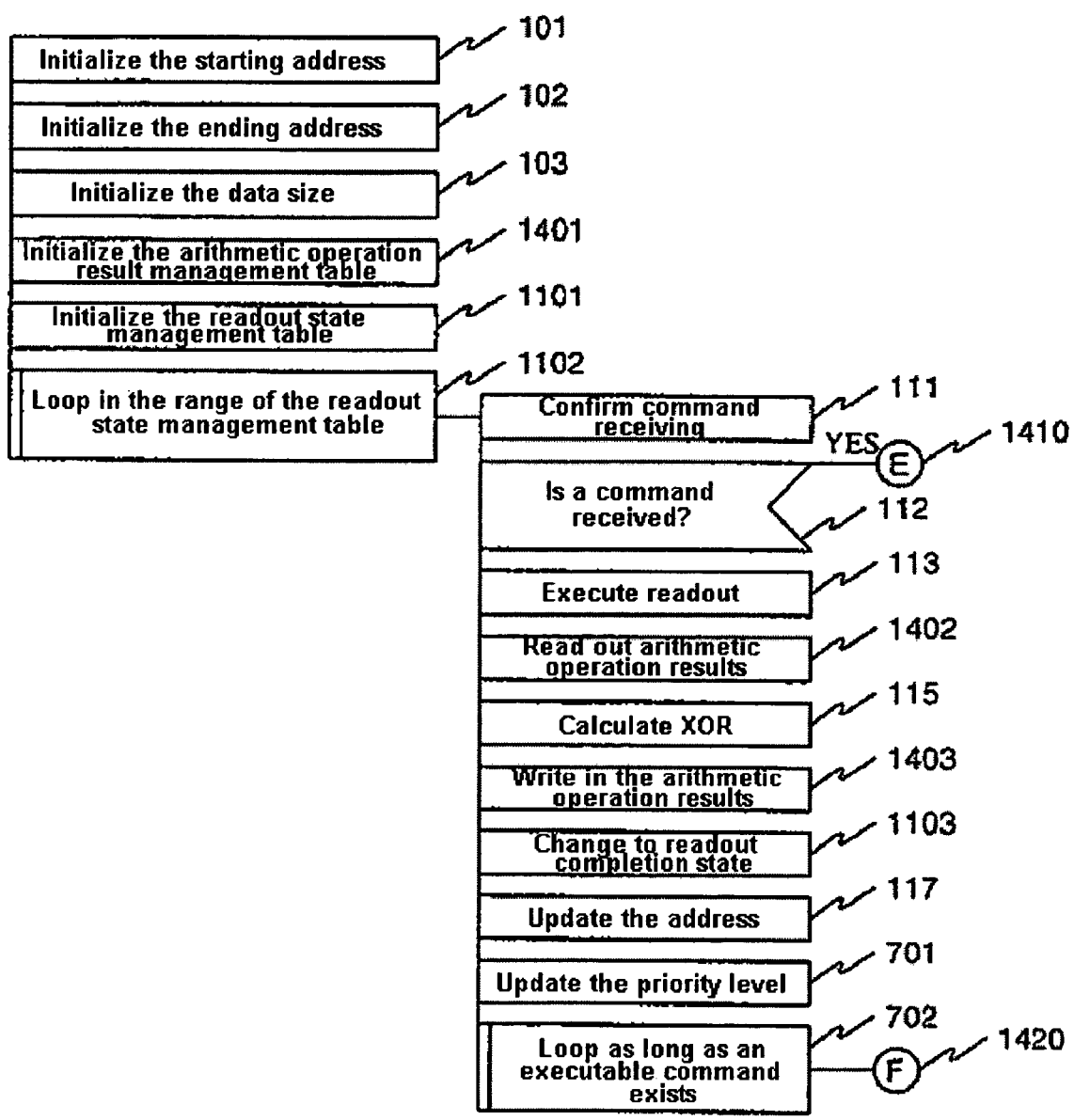
FIG. 14 is a PAD diagram of first-phase arithmetic operations for disk device data integrity inspection based on a fourth embodiment of a method for supporting data integrity inspection in disk devices according to the present invention.

FIG. 14 is a PAD diagram of first-phase arithmetic operations for disk device data integrity inspection based on the fourth embodiment of a method for supporting data integrity inspection in disk devices according to the present invention. Reference numeral 1401 in FIG. 14 denotes the step of initializing the arithmetic operation result management table, 1402 the step of reading out first-phase arithmetic operation interim results from the arithmetic operation result management table, and 1403 the step of writing first-phase arithmetic operation interim results into the arithmetic operation result management table. Reference numeral 1410 denotes a subroutine for confirming receipt of a third command, and 1420 a subroutine for executing the third command.

Figure 15:
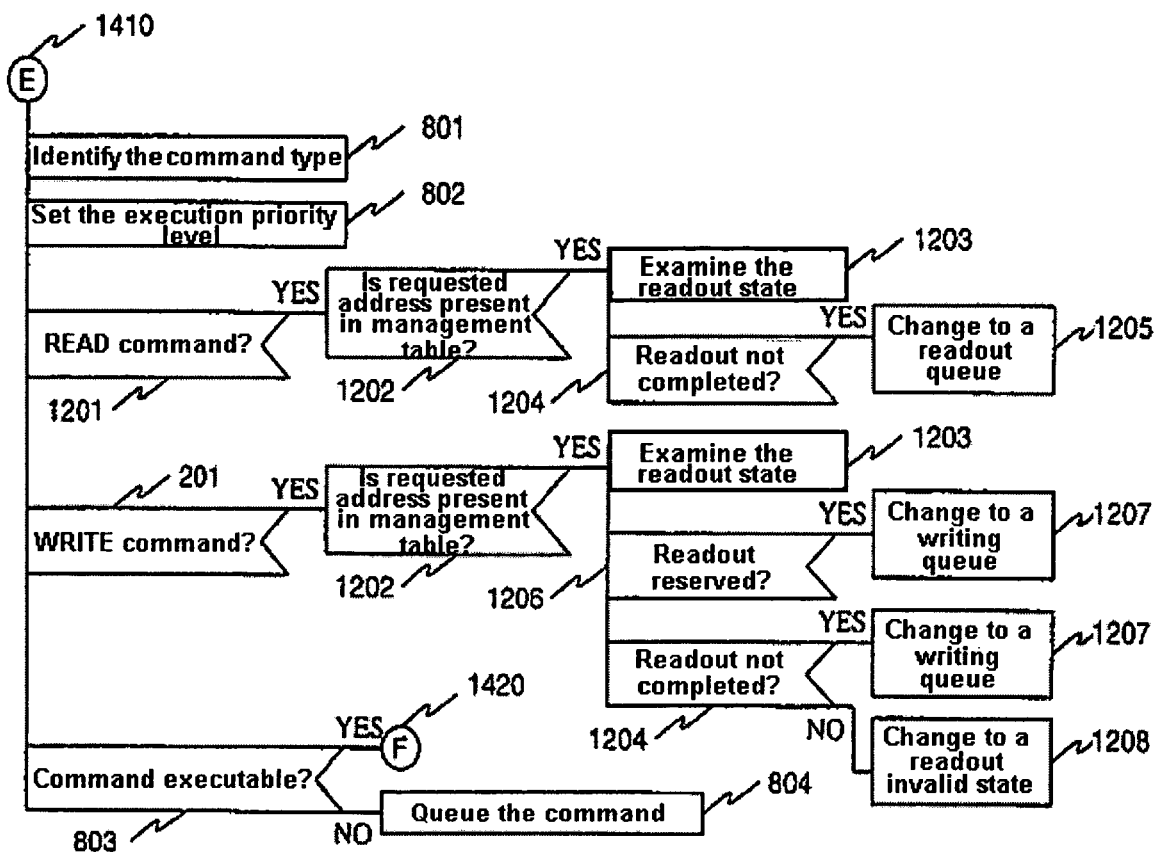
FIG. 15 is a PAD diagram of a subroutine for confirming receipt of a third command.
Figure 16:
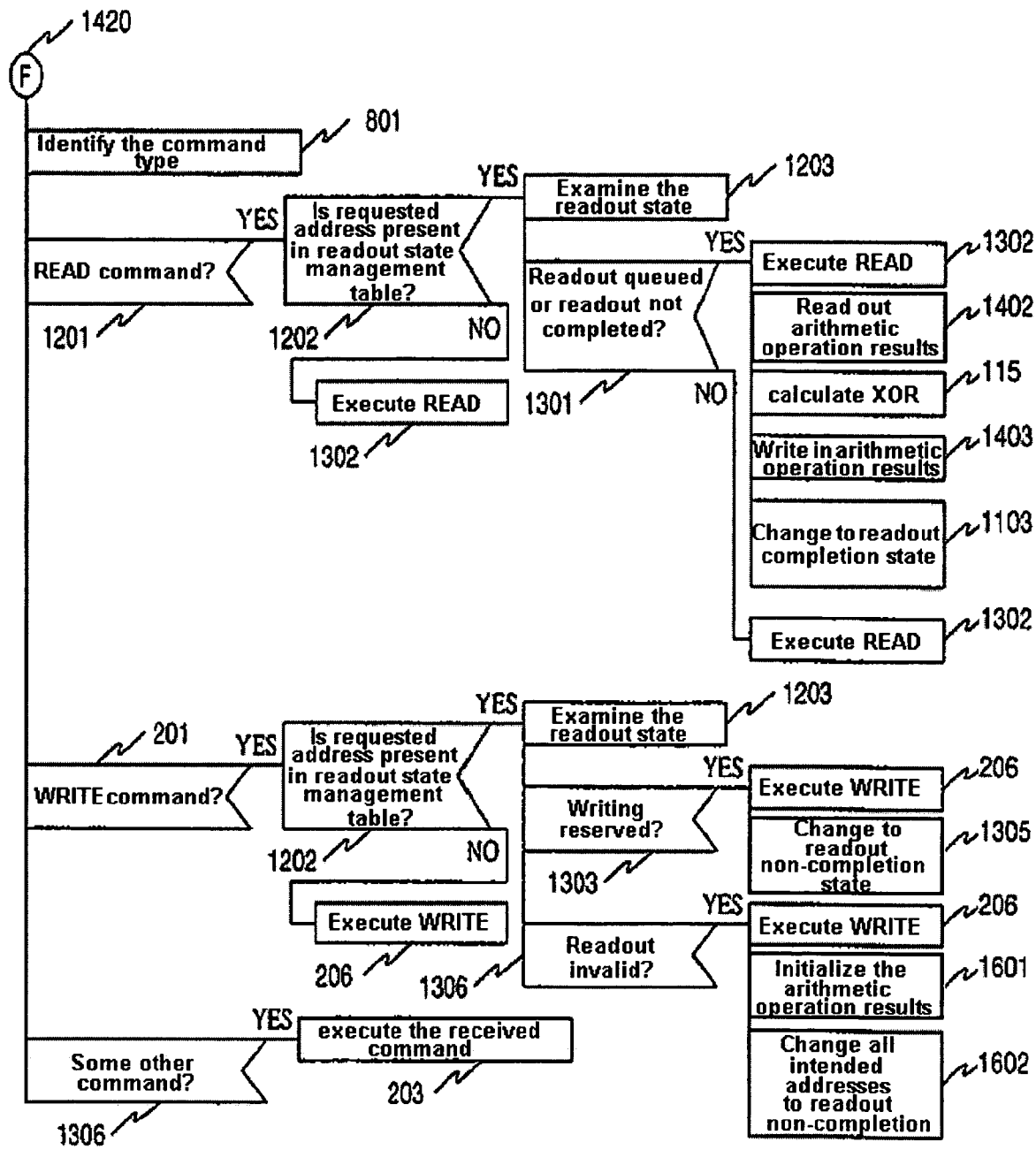
FIG. 16 is a PAD diagram of a subroutine for executing the third command.

FIG. 15 is a PAD diagram of the subroutine for confirming receipt of the third command. FIG. 16 is a PAD diagram of the subroutine for executing the third command. Reference numeral 1601 in FIG. 16 denotes the step of initializing arithmetic operation results, and 1602 the step of changing all intended addresses to readout non-completion states.

In the present embodiment, the storage medium of the disk device is split into multiple regions and interim results on arithmetic operations of a first phase are saved in each region. When an access pattern from a host computer has spatial locality, it is more efficient to restart the arithmetic operations of the first phase after access to a block address range has ended, than to perform step groups 210 and 220 for regions each time a writing event occurs for a block which has already been read out. In the present embodiment, the storage medium of the disk device is split according to a succession of block addresses and interim results on the arithmetic operations of the first phase are saved for each block address group. A splitting size of the storage medium can be specified using a vendor-unique command, S.M.A.R.T., or the like. When the administrator of the disk array apparatus specifies a splitting size from the console of the disk array apparatus, the controller thereof sets the specified size for each disk device. Since a size of each set of interim results equals the block size, a size of the arithmetic operation result management table equals the value obtained by multiplying a splitting quantity of the storage medium by the block size. For instance, if a disk device with a capacity of 100 GB has its storage medium split into 100-MB regions and data has a block size of 4 KB, the size of the arithmetic operation result management table becomes (100 GB/100 MB)×4 KB=4 MB. The arithmetic operation result management table is placed in the cache memory 603 of the disk device or on the storage medium. In which of the two locations the arithmetic operation result management table will be actually used depends on a size of the cache memory 603 and on the size of the arithmetic operation result management table.

Processing on a saving location for arithmetic operation interim results differs between the first-phase arithmetic operations in the third embodiment and those of the fourth embodiment. In step 104 of FIG. 11, a region for saving interim results on the arithmetic operations of the first phase is reserved in the cache memory 603 and the region is initialized. In step 1401 of FIG. 14, however, a region for the arithmetic operation result management table in FIG. 10 is reserved in the cache memory 603 or on the storage medium and the region is initialized. In FIG. 11, the interim-results saving region within the cache memory 603 is accessed in steps 114 and 116. In FIG. 14, however, the entry in the arithmetic operation result management table that is to be subjected to the arithmetic operations is accessed in steps 1402 and 1403. In FIG. 11, when the conditional judgment results in step 112 indicate a true state, subroutine 1110 is executed and in loop 702, subroutine 1120 is executed. In FIG. 14, however, when the conditional judgment results in step 112 indicate a true state, subroutine 1410 is executed and in loop 702, subroutine 1420 is executed.

Next, subroutine 1410 is described below. Subroutine 1410 is basically the same as subroutine 1110. The only difference from subroutine 1110 exists in that when the conditional judgment results in step 803 indicate a true state, subroutine 1420 is executed instead of step 1120.

Next, subroutine 1420 is described below. Subroutine 1420 differs from subroutine 1120 in terms of processing of the section accessing the arithmetic operation result management table. For processing of a readout command, in subroutine 1120, an interim-results saving location present in the cache memory 603 is accessed in steps 114 and 116, whereas, in subroutine 1420, the entry in the arithmetic operation result management table that is to be subjected to the arithmetic operations is accessed in steps 1402 and 1403. For processing of a writing command, processing executed when writing is invalid differs between subroutines 1120 and 1420. In subroutine 1120, step groups 210, 220 are performed to conduct readout into a block address before and after execution of the writing command, and conduct the arithmetic operations of the first phase when the writing command is executed. In subroutine 1420, however, when the conditional judgment results in step 1304 indicate a true state, the writing command is executed in step 206 and then control proceeds to step 1601. Interim results on the arithmetic operations of the entry within the arithmetic operation result management table that is associated with the block address group including the block address for which the writing command has been executed are initialized in step 1601. The initialization is conducted because execution of writing onto the storage medium has made data integrity of the interim results not obtainable. On completion of step 1601, control proceeds to step 1602. All states in the readout state management table that are associated with the block address group assigned to the block address into which writing was executed are changed to readout non-completion states in step 1602. This allows the first-phase arithmetic operations for the corresponding block address group to be restarted from the related first step since the interim results were initialized.

In the present embodiment, arithmetic operation results of the first phase are saved for each block address group, in the arithmetic operation result management table. Such result data can be read out for each block address group when the readout is requested using the vendor-unique command, S.M.A.R.T., or the like sent from the host apparatus such as the controller of the disk array apparatus. The result data can also be read out as a single set of data by conducting further arithmetic operations for each block address group.

When an apparatus such as a large-scale disk array apparatus which employs RAID-5 has a large quantity of disk devices inside and is required to be high in processing performance and in reliability, use of the present invention allows data integrity to be inspected without consuming an interface band of the disk devices and internal resources of the disk array apparatus.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A support method for data integrity inspection in a disk device, the disk device having a storage medium, a buffer for temporary storage, and a controller that controls reading from and writing into the storage medium and the temporary storage buffer by exchanging a command and data with a host apparatus, the controller, repeatedly performing the steps of:
    reading out a desired data size of first data from a readout address of the storage medium;
    reading out the desired data size of second data from the temporary storage buffer;
    executing an arithmetic operation between the first data and the second data;
    writing the arithmetic operation results obtained from the arithmetic operation, into the temporary storage buffer; and
    updating the readout address, wherein the controller performs the steps of:
    receiving a command from a host apparatus;
    identifying a type of the command received;
    setting an execution priority level for the received command according to the particular type thereof;
    judging whether the received command can be executed in accordance with the execution priority level set;
    if, in said judgment step, the command is judged to be executable, executing the command;
    if, in said judgment step, the command is judged not to be executable, queuing the command;
    updating the execution priority level of queued commands; and
    executing the commands that has been made executable by the updating of the execution priority level.

2. The data integrity inspection support method for a disk device according to claim 1, wherein the controller, upon receiving an addressing command issued from the host apparatus, sets an internal starting address of the storage medium and/or an internal ending address thereof for the readout of the desired data.

3. The data integrity inspection support method for a disk device according to claim 1, wherein the controller, upon receiving a data size specifying command issued from the host apparatus, specifies the desired data size.

4. The data integrity inspection support method for a disk device according to claim 1, wherein the arithmetic operation is exclusive OR.

5. The data integrity inspection support method for a disk device according to claim 1, wherein the controller performs the steps of:
    receiving a writing command from a host apparatus;
    checking if the step of reading out the desired data from the address of the storage medium that is specified by the writing command is performed;
    if said readout step is already performed, after executing said data readout step and said arithmetic operation conducting step on the address from which the desired data has been read out,
    executing the writing command; and
    conducting said data readout step and arithmetic operation execution step on the address for which the writing command has been executed.

6. The data integrity inspection support method for a disk device according to claim 1, wherein the controller, after interpreting an arithmetic operation execution command to be executed between first data and second data issued from the host apparatus, starts performing,
    the reading out of the desired data size of first data from the readout address of the storage medium;
    the reading out of the desired data size of second data from the temporary storage buffer;
    the executing of the arithmetic operation between the first data and the second data;
    the writing of the arithmetic operation results obtained from the arithmetic operation, into the temporary storage buffer; and
    the updating the readout address, wherein the controller performs the steps of:
    the receiving of the command from the host apparatus;
    the identifying of the type of the command received;
    the setting of the execution priority level for the received command according to the particular type thereof;
    the judging of whether the received command can be executed in accordance with the execution priority level set;
    if, in said judgment step, the command is judged to be executable, the executing the command;
    if, in said judgment step, the command is judged not to be executable, the queuing the command;
    the updating of the execution priority level of queued commands; and
    the executing of the commands that have been made executable by the updating of the execution priority level.

7. The data integrity inspection support method for a disk device according to claim 1, wherein the controller, after interpreting an arithmetic operation execution command issued from a host apparatus, raises execution priority levels of the steps of:
    reading out a desired data size of first data from a readout address of the storage medium;
    reading out the desired data size of second data from the temporary storage buffer;
    executing an arithmetic operation between the first data and the second data;
    writing the arithmetic operation results obtained from the arithmetic operation, into the temporary storage buffer; and
    updating the readout address.

8. The data integrity inspection support method for a disk device according to claim 1, the controller performing the steps of:
    receiving an arithmetic operation result readout command that the host apparatus issues;
    reading out the arithmetic operation results from the temporary storage buffer; and
    transmitting the arithmetic operation results that have been read out, to the host apparatus as a response to the arithmetic operation result readout command.

9. A support method for data integrity inspection in a disk device, the disk device having a storage medium, a buffer for temporary storage, and a controller that controls writing into and reading from the storage medium and the temporary storage buffer by exchanging a command and data with a host apparatus, the controller performing:
    a step of reserving in the storage medium or the temporary storage buffer a readout state management table for managing relationships between addresses within the storage medium and respective readout states;
    until all readout states in the readout state management table have become readout completion states, for each address,
    the additional steps of:
    reading out a desired data size of first data from the storage medium;

reading out the desired data size of second data from the temporary storage buffer;

executing an arithmetic operation between the first data and the second data;

writing the first arithmetic results obtained from the arithmetic operation, into the temporary storage buffer; and changing a readout state of an associated address within the readout state management table to a readout completion state;

the further step of:

examining, within the readout state management table, a readout state associated with the address requested by the readout command issued from a host apparatus, and if the readout state indicates that readout is not completed, changing the particular readout state to a readout queue; and when executing the readout command, if the readout state of the address requested by the readout command indicates that the readout is queued, the further steps of:

reading out the desired data size of third data from the storage medium;

reading out the desired data size of fourth data from the temporary storage buffer;

executing an arithmetic operation between the third data and the fourth data;

writing the second arithmetic results obtained from the arithmetic operation, into the temporary storage buffer; and changing, within the readout state management table, the readout state associated with the address requested by the readout command, to a readout completion state.

10. The data integrity inspection support method for a disk device according to claim 9, the controller performing:

a step of:

examining, within the readout state management table, the readout state associated with the address requested by a writing command issued from a host apparatus, and if the readout state indicates that the readout is not completed or that the readout is queued, changing the particular readout state to a write queue, or if the readout state indicates that the readout is completed, changing the particular readout state to a readout invalid state;

when executing the writing command, if a readout state of the address requested by the writing command indicates that the writing is queued, the additional steps of:

executing the writing command; and changing, within the readout state management table, the readout state associated with the address requested by the writing command, to a readout non-completion state; and if the readout state of the address requested by the writing command indicates that the readout is invalid, the further steps of:

reading out the desired data size of fifth data from the address of the storage medium that is requested by the writing command;

reading out the desired data size of sixth data from the temporary storage buffer;

executing the arithmetic operation between the fifth data and the sixth data;

writing the third arithmetic results obtained from the arithmetic operation, into the temporary storage buffer;

executing the writing command;

reading out the desired data size of seventh data from the address of the storage medium that is requested by the writing command;

reading out the desired data size of eighth data from the temporary storage buffer;

executing an arithmetic operation between the seventh data and the eighth data;

writing the fourth arithmetic results obtained from the arithmetic operation, into the temporary storage buffer; and changing, within the readout state management table, the readout state associated with the address requested by the write command, to a readout completion state.

11. A support method for data integrity inspection in a disk device, the disk device having a storage medium, a buffer for temporary storage, and a controller that controls writing into or reading from the storage medium and the temporary storage buffer by exchanging a command and data with a host apparatus, the controller performing:

the steps of:

reserving in the storage medium or the temporary storage buffer an arithmetic operation result management table for managing a relationship between an address range of the storage medium and an arithmetic operation result; and reserving in the storage medium or the temporary storage buffer a readout state management table for managing relationships between addresses within the storage medium and respective readout states;

until all readout states in the readout state management table have become readout completion states, for each address, the additional steps of:

reading out arithmetic results from the entry of the arithmetic operation result management table that is associated with the particular address;

reading out first data from the address of the storage medium;

arithmetically deriving a new arithmetic result from the arithmetic operation with the first data;

writing the new arithmetic operation results obtained from the arithmetic operation, back into the entry of the arithmetic operation result management table that is associated with the address; and changing the entry of the readout state management table that is associated with the address, to a readout completion state;

the further steps of:

examining, within the readout state management table, a readout state associated with the address requested by the readout command issued from the host apparatus, and changing the particular readout state to a readout queue if the readout state indicates that readout is not completed;

examining, within the readout state management table, a readout state associated with the address requested by the writing command issued from the host apparatus, and changing the particular readout state to a writing queue if the readout state indicates that readout is not completed or that the readout is queued, or changing the particular readout state to a readout invalid state if the readout state indicates that the readout is completed;

when executing data readout from the storage medium, if, in the readout state management table, the readout state of the associated readout address indicates that the readout is not completed or that the readout is queued, the further steps of:
reading out arithmetic results from the entry of the readout state management table that is associated with the particular readout address;
reading out second data from the readout address within the storage medium;
arithmetically deriving a new arithmetic result from the arithmetic operation with the second data;
writing the new arithmetic operation results back into the entry of the arithmetic operation result management table that is associated with the readout address; and
changing the entry of the readout state management table that is associated with the readout address, to a readout completion state;
if, in the readout state management table, the readout state of the address associated with the readout address is other than a readout non-completion state or a readout queue,
the step of reading out the second data from the readout address within the storage medium; and
when executing data writing into the storage medium,
if, in the readout state management table, a readout state associated with a writing address into which data is to be written indicates that readout is not completed,
the further steps of:
writing third data into the writing address of the storage medium;
if, in the readout state management table, a readout state associated with the writing address indicates that writing is queued,
writing the third data into the writing address of the storage medium;
changing the entry of the readout state management table that is associated with the writing address, to a readout non-completion state;
if, within the readout state management table, the readout state associated with the writing address indicates a readout invalid state,
writing the third data into the writing address of the storage medium;
initializing an entry associated with the writing address in the arithmetic operation result management table; and
changing an associated entry within the readout state management table to a readout non-completion state with respect to all addresses within the address range specified by the entry associated with the writing address in the arithmetic operation result management table.

12. The support method for data integrity inspection in a disk device according to claim 11,
wherein the controller performs the steps of:
receiving an arithmetic operation result readout command issued from the host apparatus; and
setting a step of, if all addresses defined in the readout state management table are not in a readout completion state, preferentially executing a change of a readout state of each defined address to the readout completion state;
wherein the controller repeatedly performs the steps of:
for each address ranging from the first address within the arithmetic operation result management table to the last address,
reading out arithmetic operation results from the entries of the arithmetic operation result management table that are associated with the addresses of the address range; and
arithmetically deriving a new arithmetic operation result on the entire disk device, from the arithmetic operation results that were read out, and from the previous arithmetic operation result on the entire disk device; and
wherein after completion of the arithmetic operations for all the addresses within the arithmetic operation result management table,
the controller further performs the step of transmitting the arithmetic operation result on the entire disk device to the host apparatus as a response to the arithmetic operation result readout command.

13. A method for inspecting data integrity in a disk array apparatus, the disk array apparatus including:
a plurality of disk devices each provided with a data integrity inspection support function;
a buffer for temporary storage; and
a disk array controller that issues read/write commands to the disk devices and to the temporary storage buffer,
the disk array controller performing the steps of:
reading out arithmetic operation results from each of the plural disk devices and recording the arithmetic operation results in the temporary storage buffer;
calculating a new arithmetic operation result on the disk array apparatus, for each set of arithmetic operation results recorded in the temporary storage buffer independently for each of the disk devices, by executing arithmetic operations between the arithmetic operation result on each disk device and the arithmetic operation results on the disk array apparatus;
executing comparisons between the arithmetic operation results on the disk array apparatus, and an expected value;
if the comparisons indicate matching of the operation result on the disk array apparatus and the expected value, judging that data integrity in the plural disk devices is maintained; and
if the comparisons do not indicate the match, judging that data integrity in the plural disk devices is not maintained.

14. The method for inspecting data integrity in a disk array apparatus according to claim 13, wherein the disk array controller performs the steps of:
if the comparisons do not indicate the match, issuing, to each of the plural disk devices, one or a plurality of commands for verifying whether each disk device is in normal operation;
receiving from the disk device a response to the command or the plurality of commands; and
examining the response and judging whether the disk device is in normal operation.

15. The method for inspecting data integrity in a disk array apparatus according to claim 13, wherein the disk array apparatus further includes a console, the console displaying judgment results in said step of judging that data integrity is maintained, or in said step of judging that data integrity is not maintained.

16. The method for inspecting data integrity in a disk array apparatus according to claim 14, wherein the disk array apparatus further includes a console, the console displaying judgment results in said step of judging whether the disk device is in normal operation.

17. The method for inspecting data integrity in a disk array apparatus according to claim 13, wherein the arithmetic operations are exclusive OR.

18. The method for inspecting data integrity in a disk array apparatus according to claim 13, wherein the disk array apparatus further includes a console, the console issuing an instruction to the disk array controller such that the disk array controller issues to each of the plural disk controllers a command which specifies a starting address and ending address for calculating arithmetic operation results on each disk device.

19. The method for inspecting data integrity in a disk array apparatus according to claim 13, wherein the disk array apparatus further includes a console, the console issuing a command to the disk array controller such that the disk array controller issues to each of the plural disk devices an instruction which specifies a data size for calculating arithmetic operation results on each disk device.

* * * * *

UNITED STATES PATENT AND TRADEMARK OFFICE
CERTIFICATE OF CORRECTION

| | |
|---|---|
| PATENT NO. | : 7,577,897 B2 |
| APPLICATION NO. | : 11/274571 |
| DATED | : August 18, 2009 |
| INVENTOR(S) | : Tetsuya Uemura |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Seventh Day of September, 2010

David J. Kappos
*Director of the United States Patent and Trademark Office*